(12) United States Patent
Ishii et al.

(10) Patent No.: US 7,009,640 B1
(45) Date of Patent: Mar. 7, 2006

(54) COLOR REPRODUCTION SYSTEM FOR CARRYING OUT COLOR CORRECTION BY CHANGING OVER COLOR CORRECTION PARAMETERS ACCORDING TO IMAGES OF PHOTOGRAPHED SUBJECTS

(75) Inventors: Kensuke Ishii, Tokyo (JP); Kenro Ohsawa, Musashino (JP)

(73) Assignee: Olympus Corporation, Tokyo (JP)

( * ) Notice: Subject to any disclaimer, the term of this patent is extended or adjusted under 35 U.S.C. 154(b) by 935 days.

(21) Appl. No.: 09/583,521

(22) Filed: May 31, 2000

(30) Foreign Application Priority Data

May 31, 1999 (JP) ................................. 11-151969
Jun. 18, 1999 (JP) ................................. 11-172772

(51) Int. Cl.
*H04N 9/73* (2006.01)

(52) U.S. Cl. .................................. 348/223.1; 358/518

(58) Field of Classification Search ............. 348/223.1, 348/222.1, 234, 235, 29, 223; 358/518, 520, 358/523, 1.9; 382/162, 164, 165, 167
See application file for complete search history.

(56) References Cited

U.S. PATENT DOCUMENTS

| | | | | |
|---|---|---|---|---|
| 5,982,416 A | * | 11/1999 | Ishii et al. ................... | 348/29 |
| 6,037,950 A | * | 3/2000 | Meir et al. .................. | 345/427 |
| 6,643,029 B1 | * | 11/2003 | Kumada et al. ............. | 358/1.9 |

* cited by examiner

*Primary Examiner*—David L. Ometz
*Assistant Examiner*—Heather R Jones
(74) *Attorney, Agent, or Firm*—Straub & Pokotylo; John C. Pokotylo

(57) ABSTRACT

A color reproduction system has a color image input section, and a color correcting section for correcting colors of a subject image obtained by photographing a subject by the color image input section. The color correcting section corrects colors by changing over a plurality of color correction parameters according to a subject image signal from the color image input section.

2 Claims, 30 Drawing Sheets

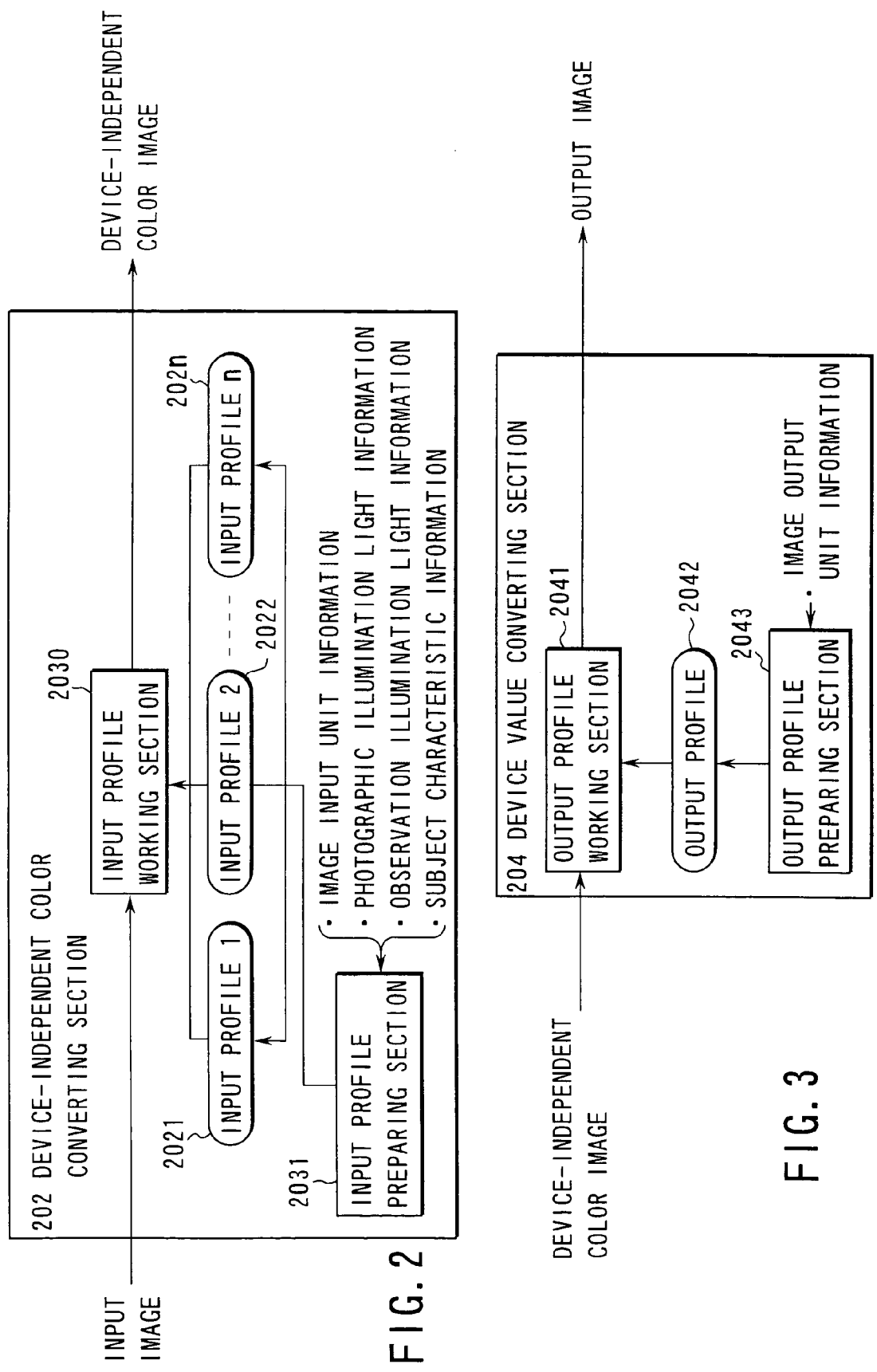

SUBJECT SPECTRAL REFLECTANCE DATABASE

| WAVELENGTH \ NUMBER | 1 | 2 | ... | 1000 |
|---|---|---|---|---|
| 380 | 0.25 | 0.52 | | 0.35 |
| 381 | 0.35 | 0.68 | | 0.58 |
| 382 | 0.38 | 0.66 | | 0.67 |
| 383 | 0.44 | 0.53 | | 0.65 |
| . | . | . | | . |
| . | . | . | ... | . |
| . | . | . | | . |
| 779 | 0.29 | 0.85 | | 0.18 |
| 780 | 0.22 | 0.88 | | 0.15 |

DATABASE PHOTOGRAPHIC SIGNAL

| CHANNEL \ NUMBER | 1 | 2 | ... | 1000 |
|---|---|---|---|---|
| R | 25 | 65 | ... | 25 |
| G | 56 | 38 | ... | 13 |
| B | 33 | 121 | ... | 28 |

COLOR REPRODUCTION SYSTEM FOR CARRYING OUT COLOR CORRECTION BY CHANGING OVER COLOR CORRECTION PARAMETERS ACCORDING TO IMAGES OF PHOTOGRAPHED SUBJECTS

CROSS-REFERENCE TO RELATED APPLICATIONS

This application is based upon and claims the benefit of priority from the prior Japanese Patent Applications No. 11-151969, filed May 31, 1999; and No. 11-172772, filed Jun. 18, 1999, the entire contents of which are incorporated herein by reference.

BACKGROUND OF THE INVENTION

The present invention relates to a color reproduction system having a color image processing unit for estimating colors of a photographed subject from photographic signals obtained by photographing the subject by a color photographing unit such as a digital camera or the like.

As a method of estimating color information on a photographed subject under a predetermined illumination light from color-image data obtained by photographing the subject by a color photographing unit such as a digital camera or the like, there has been proposed a method of using foresight information on the photographed subject such as a base function or a correlation matrix of a spectral reflectance of the subject, as disclosed in Japanese Patent Application KOKAI Publication No. 11-85952. When a base function or a correlation matrix of a spectral reflectance of the subject is used, it is possible to estimate colors of the subject in high precision and reproduce the colors even if a photographic illumination light at the time of the photographing is different from an observation illumination light at the time of an observation.

This conventional color reproduction system uses a spectral sensitivity of a color photographing unit, a photographic illumination light spectrum and an observation illumination light spectrum as information for estimating colors. However, these data have conventionally been obtained by measurement using an expensive measuring instrument such as a spectrometer. Therefore, it has not been possible to provide a simple color reproduction system.

On the other hand, in Jpn. Pat. Appln. KOKAI Publication No. 11-96333, there has been disclosed another method of utilizing a photographic signal of an object such as color charts of known spectral reflectances obtained by photographing the object at the same time as the photographing of a subject or under the same photographing conditions. This method is for estimating color information of the photographed subject under a predetermined illumination light by utilizing the object photographic signal, without using the spectral sensitivity of the color photographing unit or measurement data of the photographic illumination light spectrum. According to this method, it is not necessary to measure in advance the spectral sensitivity of a color-photographing unit. It is not necessary to measure a photographic illumination light spectrum at the time of photographing, either. Therefore, this method can simplify the system.

For example, it is possible to arrange as follows. At a hospital A, a face of a patient is photographed in colors by a digital camera, and at the same time, a predetermined color chart is photographed. The image data of these photographs are transferred to a hospital B. At the hospital B, the face colors of the patient are converted into face colors of the patient under the observation illumination light at the hospital B, and the converted face colors are displayed on the monitor. When this system is employed, an expensive measuring instrument like a spectrometer is not necessary at the hospital A where the picture is taken. Thus, it becomes easy to obtain the data for accurate reproduction of colors.

In the above-described color reproduction system for converting illumination colors by using the foresight information of a subject, it is essential that the color photographing unit has independent spectral sensitivities by at least the number of base functions of spectral reflectances of the subject in order to make an accurate estimate of colors of the subject. It is known that spectral reflectances of body skin colors can be displayed in high precision by a linear sum of three base functions. However, in general, in order to display all the spectral reflectances of an object in the natural world, more base functions are considered to be necessary. Therefore, in order to carry out a simple color reproduction in high precision by using a general three-band digital camera having three bands of red (R), green (G), and blue (B), there has been a problem that a subject to be photographed is limited to an object that has spectral reflectances that can be approximated by three base functions.

On the other hand, there has been known a color reproduction system for carrying out a color reproduction by selecting a suitable set of an output profile and an input profile for one input image, as shown in FIG. 23. In FIG. 23, an input image from an image input unit 10 is input to a device-independent color converting section 11A of a color correcting section 11. The device-independent color converting section 11A converts colors of the input image into a device-independent color image by referring to an input profile 111A, and outputs the device-independent color image to a device value converting section 11B. The device value converting section 11B converts the device-independent color image into a device value that matches the characteristics of an output unit by referring to an output profile 111B, and outputs the device value as an output image to an image output unit 12.

Japanese Patent Publication No. 2678007 discloses a color information correcting unit for correcting a plurality of pieces of read information of a plurality of color components into corresponding recording information for a plurality of record open image colors based on color correction parameters, in the reading of color images.

Further, Japanese Patent Publication No. 2681181 discloses a color data correcting unit that includes an operating unit for correcting colors by carrying out a matrix calculation in color data that has been obtained by digitizing an input signal.

The above-described conventional color reproduction method in the color reproduction system is for carrying out a color reproduction by selecting a suitable set of an output profile and an input/output profile for one input image. According to this method, colors are reproduced based on the same subject characteristic data for all the objects within the image. In other words, colors are reproduced based on object spectrum statistical data. Therefore, the conversion precision is lowered when a plurality of objects are included in the image.

According to the above-described Japanese Patent Publication No. 2678007 and Japanese Patent Publication No. 2681181, although a matrix is selected based on the colors of RGB values, only colors are corrected, and the colors are not converted into colors under the illumination light of the observation side. Further, as subject characteristic data is not used, colors cannot be reproduced in high precision.

BRIEF SUMMARY OF THE INVENTION

It is, therefore, an object of the present invention to provide a color reproduction system capable of reproducing colors in high precision.

More specifically, it is an object of the present invention to provide a color reproduction system capable of reproducing colors of all the objects included in an image in high precision, by dividing the image into images of a plurality of areas and conducting a suitable color conversion in each divided area.

It is another object of the invention to provide a color reproduction system capable of reproducing colors in high precision, by accurately recognizing objects included in a photographed image and conducting color conversion suitable for each object.

It is still another object of the invention to provide a color reproduction system capable of reproducing colors in high precision without having characteristic information of a photographed subject in advance, by photographing color charts of known spectral reflectances and calculating characteristics of the subject from a spectral reflectance of a color chart of a value nearest a signal value obtained when the subject has been photographed.

It is still another object of the invention to provide a color reproduction system capable of reproducing colors in high precision, by estimating colors of various subjects by using a color-photographing unit of a limited number of bands.

In order to achieve the above objects, according to a first aspect of the present invention, there is provided a color reproduction system comprising:

a color image input section; and a color correcting section for correcting colors of an image of a subject obtained by photographing the subject by the color image input section, wherein the color correcting section corrects colors by changing over a plurality of color correction parameters according to a subject image signal from the color image input section.

According to a second aspect of the invention, there is provided a color reproduction system relating to the first aspect, wherein the color correcting section comprises:

an object recognizing section for dividing a subject image input from the color image input section into images of a plurality of areas, and selecting a suitable input profile from among a plurality of input profiles for each divided area;

a device-independent color converting section for converting an image of each area into a device-independent color image by using the input profile selected from among the plurality of input profiles;

an image combining section for combining the device-independent color images converted at divided areas into one device-independent color image; and a device value image converting section for converting the combined device-independent color image into an output device value image by using a predetermined output profile.

According to a third aspect of the invention, there is provided a color reproduction system relating to the first aspect, wherein the color correcting section has a plurality of input/output profiles prepared by integrating input profiles and output profiles together, and comprises:

an object recognizing section for dividing an input subject image into images of a plurality of areas, and selecting a suitable input/output profile from among the plurality of input/output profiles for each divided area;

a device value image converting section for converting an image of each area into a device value image by using the input/output profile selected from among the plurality of input/output profiles; and an image combining section for combining the device value images converted at divided areas into one device value image.

According to a fourth aspect of the invention, there is provided a color reproduction system relating to the first aspect, further comprising:

an object recognizing section for dividing a subject image data including information necessary for preparing a plurality of input profiles into images of a plurality of areas, and selecting suitable subject characteristic information from among a plurality of pieces of subject characteristic information for each divided area;

a format converting section for converting a format based on selected subject characteristic information and outputting image data capable of changing illumination by areas;

a device-independent color converting section for calculating an input profile from the illumination-variable image data, selecting a suitable input profile from among the plurality of input profiles based on the calculated input profile, and converting the image in each area into a device-independent color image by using the selected input profile;

an image combining section for combining the device-independent color images converted at divided areas into one device-independent color image; and a device value image converting section for converting the combined device-independent color image into an output device value image by using a predetermined output profile.

According to a fifth aspect of the invention, there is provided a color reproduction system relating to the first aspect, further comprising:

an area dividing section for dividing an input image into images of a plurality of areas;

a device-independent color converting section for converting the image in each divided area into a device-independent color image by using the plurality of input profiles in parallel;

a conversion result selecting section for selecting a device-independent color image for each area by comparing the plurality of converted device-independent color images;

an image combining section for converting the device-independent color images selected at divided areas into one device-independent color image; and a device value image converting section for converting the combined device-independent color image into an output device value image by using a predetermined output profile.

According to a sixth aspect of the invention, there is provided a color reproduction system relating to the first aspect, further comprising:

an area dividing section for dividing an input image into images of a plurality of areas;

a first device-independent color converting section for converting the image in each divided area into a device-independent color image by using one input profile;

a second device-independent color converting section for converting the input image in each divided area into a device-independent color image by using an input profile selected from among a plurality of input profiles for each area based on a result of the conversion in the first device-independent color converting section;

an image combining section for converting the device-independent color images converted at divided areas into one device-independent color image; and a device value image converting section for converting the combined device-independent color image into an output device value image by using a predetermined output profile.

According to a seventh aspect of the invention, there is provided a color reproduction system relating to the first aspect, further comprising:

an area dividing section for dividing an input image into images of a plurality of areas;

a first device-independent color converting section for converting the image in each divided area into a device-independent color image by using one input profile;

a spectral reflectance database for storing information on spectral reflectances of a plurality of objects;

a conversion result judging section for judging a result of the conversion at the first device-independent color converting section by referring to the spectral reflectance database;

a subject characteristic information calculating section for calculating subject characteristic information by selecting information in the spectral reflectance database based on a result of the decision by the conversion result judging section;

a second device-independent color converting section for converting the input image in each divided area into a device-independent color image by using an input profile selected from among a plurality of input profiles prepared based on the subject characteristic information calculated by the subject characteristic information calculating section;

an image combining section for converting the device-independent color images converted at divided areas into one device-independent color image; and a device value image converting section for converting the combined device-independent color image into an output device value image by using a predetermined output profile.

According to an eighth aspect of the invention, there is provided a color reproduction system relating to the first aspect, further comprising:

an object recognizing section for selecting an input profile to be used from among a plurality of input profiles based on a signal value of an image obtained by photographing using a plurality of color charts of known spectral reflectances;

a device-independent color converting section for converting an image of each area into a device-independent color image by using the input profile selected from among the plurality of input profiles;

an image combining section for combining the device-independent color images converted at divided areas into one device-independent color image; and a device value image converting section for converting the combined device-independent color image into an output device value image by using a predetermined output profile.

According to a ninth aspect of the invention, there is provided a color reproduction system relating to the first aspect, further comprising:

a spectral reflectance database having spectral reflectances of color charts;

a subject characteristic calculating section for calculating subject characteristic information from a color-chart photographic image based on signal values of an image obtained by photographing using a plurality of color charts of known spectral reflectances and data of the spectral reflectance database;

an object recognizing section for dividing a subject photographic image into images of a plurality of areas, and selecting an input profile to be used from among a plurality of input profiles based on the calculated subject characteristic information;

a device-independent color converting section for converting an image of each area into a device-independent color image by using the input profile selected from among the plurality of input profiles;

an image combining section for combining the device-independent color images converted at divided areas into one device-independent color image; and a device value image converting section for converting the combined device-independent color image into an output device value image by using a predetermined output profile.

According to a tenth aspect of the invention, there is provided a color reproduction system relating to the second aspect, wherein the input profile is prepared based on at least one of image input unit information that includes photographic characteristics of an image input unit used for the photographing and information on a set state of the color image input section, observation illumination light information, and subject characteristic information that represents statistical characteristics of spectral reflectances of the photographed subject.

According to an eleventh aspect of the invention, there is provided a color reproduction system relating to the first aspect, wherein the color correcting section comprises a color estimating section for estimating tristimulus values of the subject under an observation illumination light, based on subject photographic signals obtained by photographing the subject by the color image input section, spectral sensitivity of the color image input section, color matching functions, a spectrum of photographic illumination light, a spectrum of observation illumination light and statistical data of spectral reflectances of the subject, and the color estimating section uses the statistical data which is changed over according to the subject photographic signals.

According to a twelfth aspect of the invention, there is provided a color reproduction system relating to the first aspect, wherein the color correcting section comprises a color estimating section for estimating tristimulus values of the subject under an observation illumination light, based on object photographic signals obtained by photographing a plurality of objects of known spectral reflectances by the color image input section, subject photographic signals obtained by photographing the subject by the color image input section, color matching functions, a spectrum of observation illumination light and statistical data of spectral reflectances of the subject, and the color estimating section uses the statistical data which is changed over according to the subject photographic signals.

According to a 13th aspect of the invention, there is provided a color reproduction system relating to the eleventh aspect, wherein the color estimating section uses the statistical data which is changed over based on a relationship between spectral reflectance data for calculating statistics of spectral reflectances and the subject photographic signals.

According to a 14th aspect of the invention, there is provided a color reproduction system relating to the twelfth aspect, wherein the color estimating section uses the statistical data which is changed over based on a relationship between spectral reflectance data for calculating statistics of spectral reflectances and the subject photographic signals.

According to a 15th aspect of the invention, there is provided a color reproduction system relating to the twelfth aspect, wherein the color estimating section changes over the statistical data based on a relationship between spectral reflectance data for calculating statistics of spectral reflectances of the subject obtained from a relationship between the object photographic signals and spectral reflectances of the objects, and the subject photographic signals.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a diagram showing a detailed structure of the device-independent color converting section 202.

FIG. 3 is a diagram showing a detailed structure of a device value converting section 204.

DETAILED DESCRIPTION OF THE INVENTION

Embodiments of the present invention will be now be explained in detail with reference to the attached drawings.

First Embodiment

Figure 1:
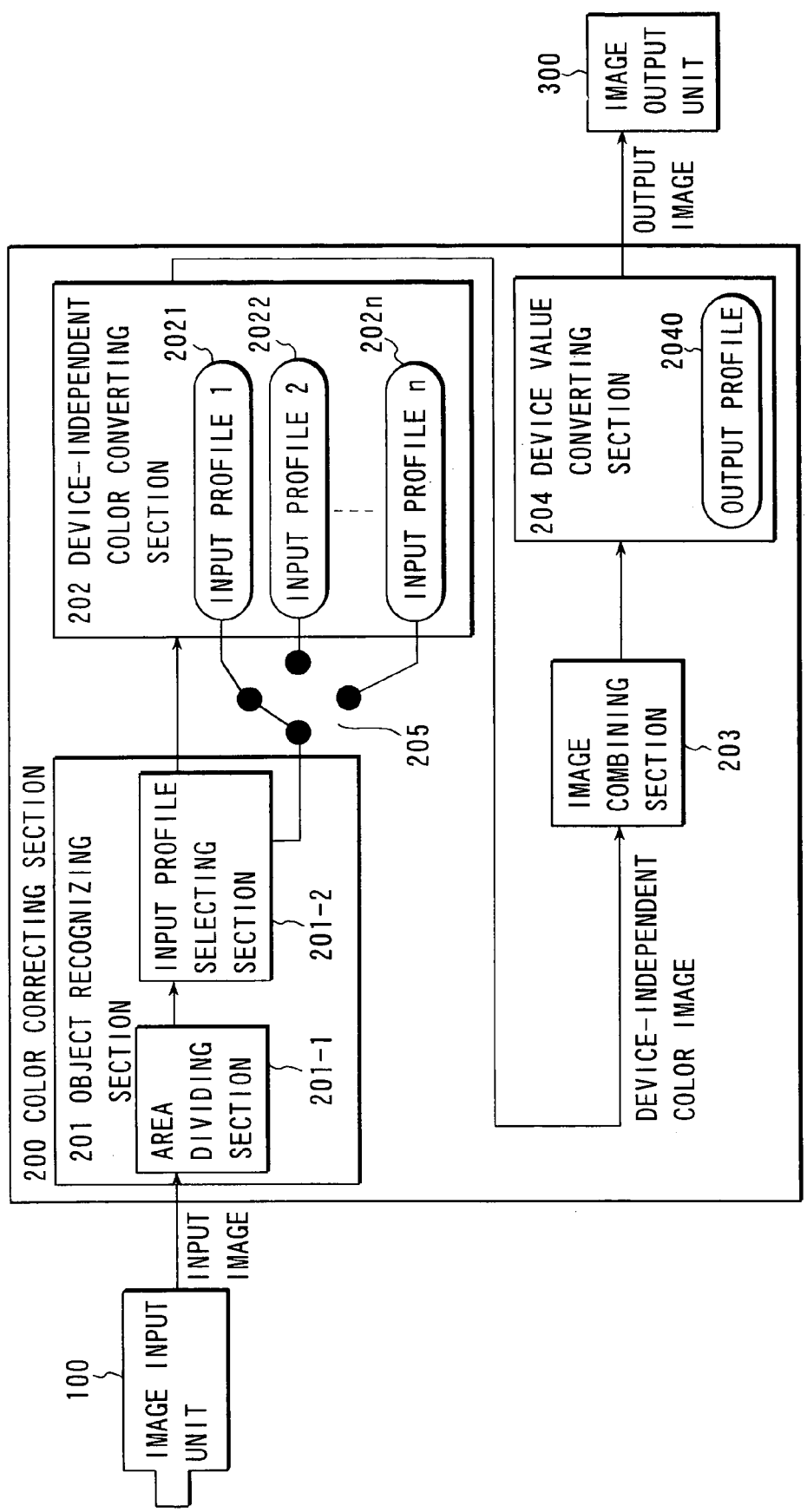
FIG. 1 is a diagram showing a structure of a color reproduction system relating to a first embodiment of the present invention.

FIG. 1 is a diagram showing a structure of a color reproduction system relating to a first embodiment of the present invention. This color reproduction system consists of an image input unit 100 for photographing an image of an object, a color correcting section 200 for correcting the input image and generating an output image, and an image output unit 300.

In the color correcting section 200, an object recognizing section 201 recognizes an object within an input image. In other words, an area dividing section 201-1 of the object recognizing section 201 divides the input image into images of a plurality of areas. An input profile selecting section 201-2 selects a suitable input profile from among a plurality of input profiles for each divided area by changing over a switch 205. A device-independent color converting section 202 has a memory unit for storing a plurality of input profiles 1 to n (2021 to 202n). The device-independent color converting section 202 converts an image in each area into a device-independent color image by using an input profile that has been selected from among the plurality of input profiles 1 to n (2021 to 202n) by the input profile selecting section 201-2. An image combining section 203 combines the device-independent color images converted into images of divided areas into one device-independent color image. A device value converting section 204 converts the combined device-independent color image into an output image by referring to an output profile 2040.

FIG. 2 is a diagram showing a detailed structure of the device-independent color converting section 202. The device-independent color converting section 202 consists of the above memory section for storing the plurality of input profiles 1 to n (2021 to 202n), an input profile preparing section 2031 for calculating an input profile based on at least one set of information of characteristics and setting of an image input unit used for a photographing (image input unit information), spectrum data of an illumination light used for photographing an image of an object by the image input unit (photographic illumination light information), spectrum data of an illumination light at a position where the image of the photographed object is to be observed (observation illumination light information), and statistical characteristics of a spectral reflectance of the photographed object (subject characteristic information), and an input profile working section 2030 for working the prepared input profile onto the input image in each divided area to convert the input image into a device-independent color image.

FIG. 3 is diagram showing details of the device value converting section 204. The device value converting section 204 consists of an output profile preparing section 2043 for calculating an output profile 2042 based on input information on an output unit (image output unit information), and an output profile working section 2041 for working the prepared output profile 2042 onto a device-independent color image to convert the device-independent color image into an output image.

The use of the above image input unit information makes it possible to convert an input image into a device-independent color image by taking into consideration differences in characteristics of various image input units and differences in the setting of photographing. It is possible to achieve a color reproduction in high precision when the image input unit 100 is a multi-spectrum camera or a digital camera for photographing a plurality of spectrum images.

Further, the use of the photographic illumination light information makes it possible to cancel influence of the illumination light at the time of the photographing. In other words, it is possible to calculate an accurate spectral reflectance of an object itself when the object is photographed by using any illumination light such as, for example, a fluorescent light, an incandescent light, solar beams, etc.

Further, the use of the observation illumination light information makes it possible to convert the colors of a photographed object into colors under any illumination light. For example, by a remote-control reproduction of colors of an object under a different illumination, it is possible to display the colors of the object as if the object is positioned at the place of observation.

Further, the use of the subject characteristic information makes it possible to estimate a color reproduction image in high precision even if the input image has little spectrum information. In other words, it is possible to estimate a spectral reflectance of an object in high precision when an image input unit is a digital camera for photographing a color image of RGB three bands instead of a digital camera for photographing a color image of a plurality of spectra. The subject characteristic information may be a correlation matrix or a base function that represents statistical characteristics of a spectral reflectance.

Further, the use of the image output unit information makes it possible to convert in high precision a device-independent color image into an output image that matches the image output unit 300. This makes it possible to reproduce colors by taking into consideration differences in characteristics and variations between monitors and between printers.

As explained above, according to the present embodiment, an input image is divided into images of a plurality of areas, and an input profile is to be used for each divided area is selected from among a plurality of input profiles. The input image is converted into a device-independent color image by using a selected input profile. Thus, it is possible to make an accurate decision on the photographed object within an image, and to use an input profile that is suitable for the subject characteristics of the object. Therefore, it is possible to achieve a color reproduction in high precision for all parts of the image.

Figure 4:
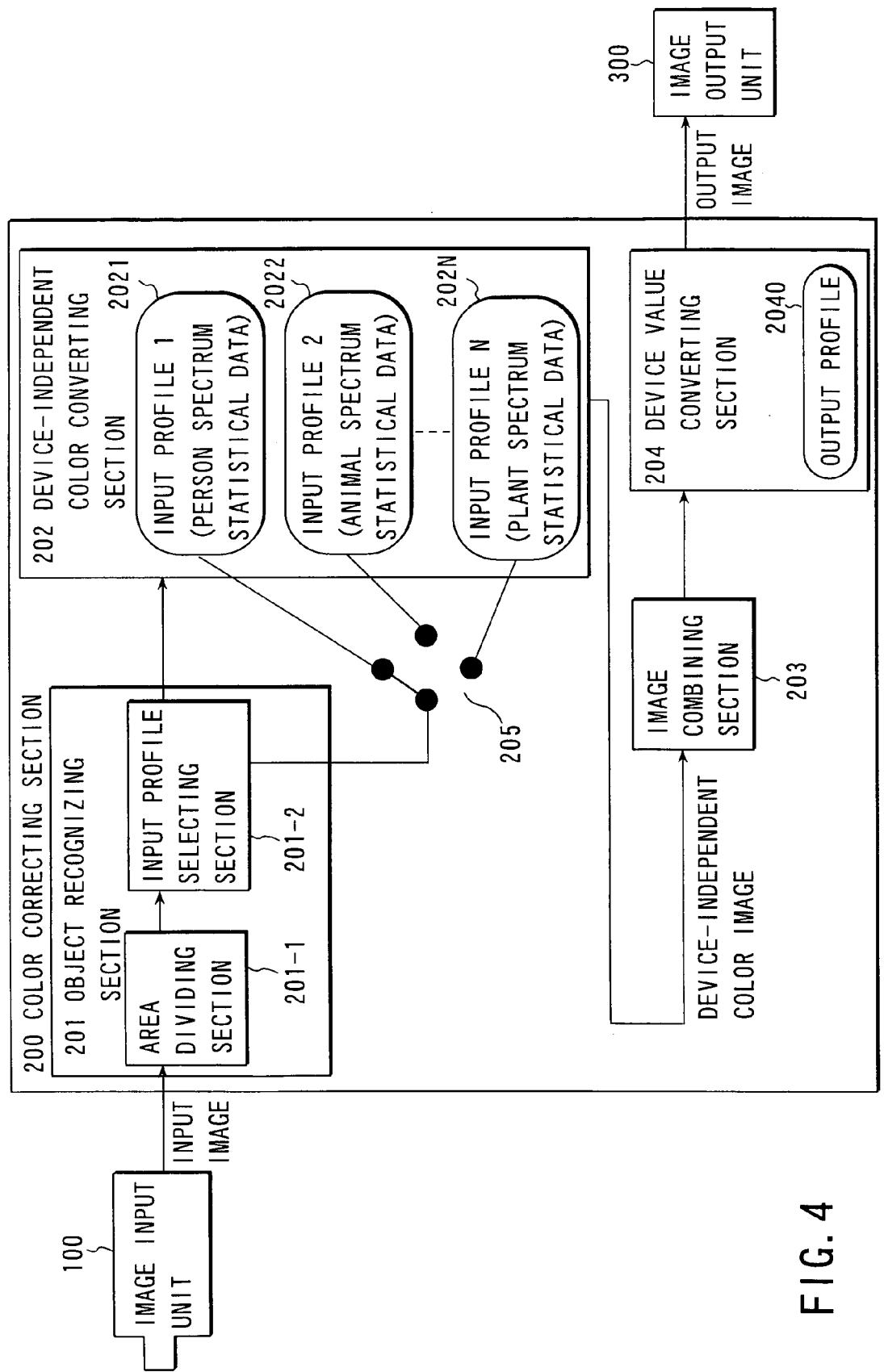
FIG. 4 is a diagram showing a structure of a modification of the first embodiment.

FIG. 4 shows a modification of the first embodiment. This shows an example of an image processing unit having a plurality of input profiles (1 to N) by using the subject characteristic information. Usually, it is difficult to pick up an image of only a desired object in one picture. A background of the selected object and other objects are also included in the same picture. When colors of these objects are processed for reproduction by using only the input profile that uses characteristic information of one subject, it is possible to reproduce the colors of the desired object in high precision. However, colors of the background and other objects are not reproduced in high precision.

To solve this problem, a color correcting section 200 in FIG. 4 uses a plurality of input profiles 2021 to 202N that use characteristic information of various subjects including a person, an animal and a plant. An object recognizing section 201 decides what has been photographed in a certain area within the image based on a signal value of an input image, and selects a suitable input profile from among a plurality of input profiles. A device-independent color converting section 202 works an input profile selected from among a plurality of input profiles 2021 to 202N onto the input image, thereby to prepare a device-independent color image. It is also possible to prepare a plurality of pieces of subject characteristic information in advance based on colors of objects or based on substances that constitute objects.

Figure 5:
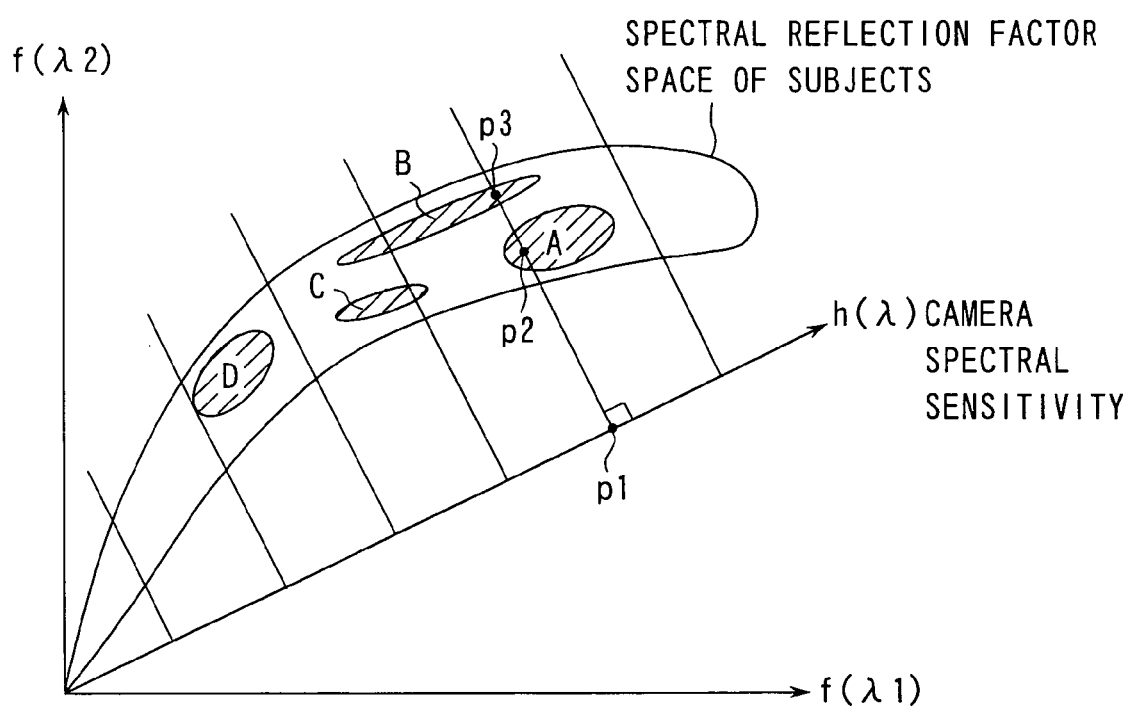
FIG. 5 is a diagram showing a distribution of a spectral reflectance space of subjects in a multi-dimensional space of a spectrum.

Assume that a spectral reflectance space of subjects is distributed in a multi-dimensional space of a spectrum as shown in FIG. 5. In FIG. 5, h ($\lambda$) represents a spectral sensitivity of a camera. On the spectral sensitivity of h (λ), a subject spectral reflectance that takes a value of a signal value p1 represents all the points on a line perpendicular to h (λ). When subject information of only one subject is used like the conventional method, p2 of a subject A and p3 of a subject B take the same signal value. Therefore, in the estimate of spectral reflectances of these subjects based on this signal value, these subjects take the same spectral reflectance.

When two sets of subject characteristic information are used for the subject A and the subject B like the present embodiment, it becomes possible to estimate two spectral reflectances for the p2 and p3, based on the same signal value p1. As explained above, by using a plurality of sets of subject characteristics, it is possible to estimate spectral reflectances of subjects in high precision.

Second Embodiment

Figure 6:
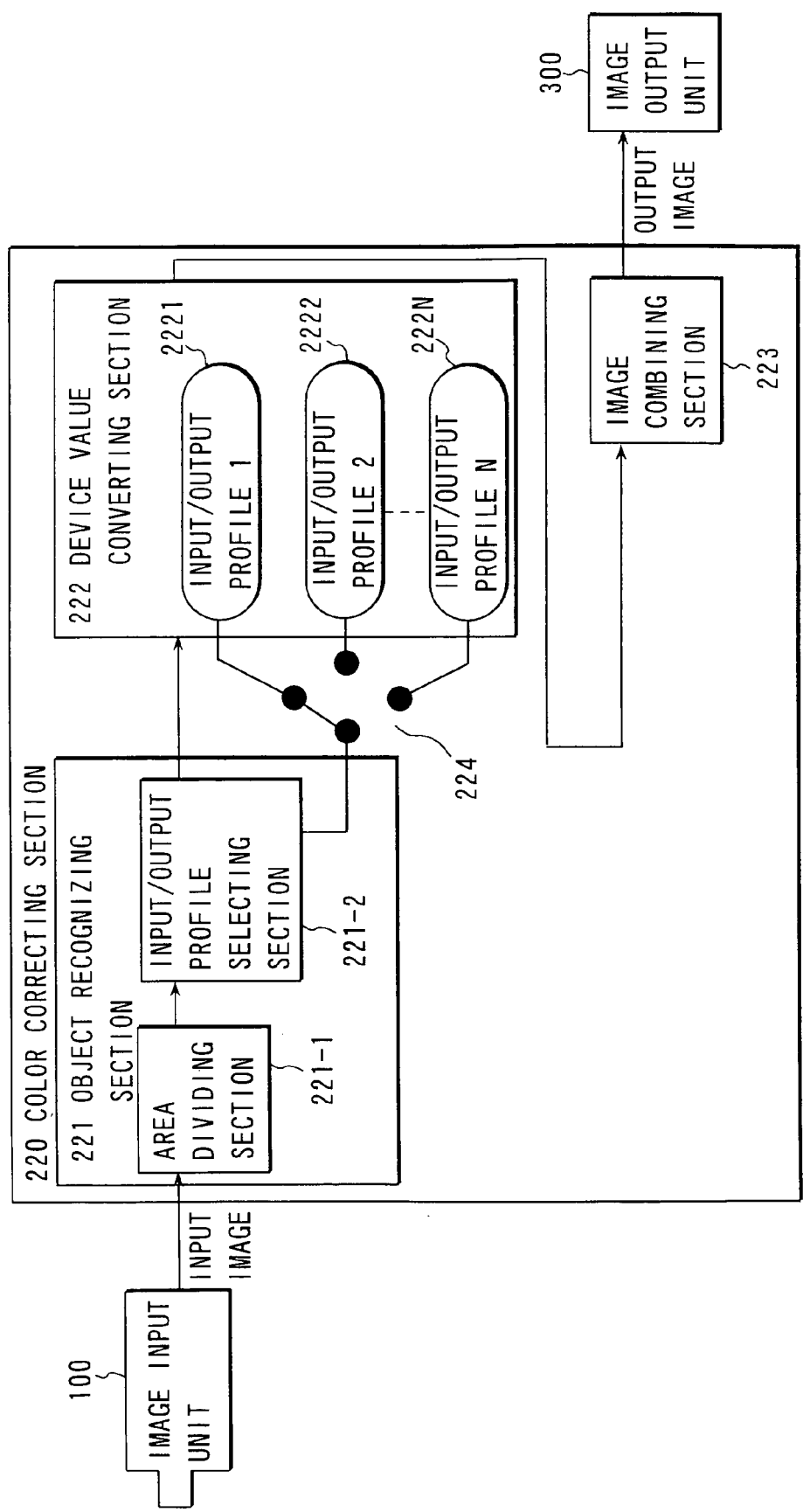
FIG. 6 is a diagram showing a structure of a color reproduction system relating to a second embodiment of the present invention.

FIG. 6 is a diagram showing a structure of a color reproduction system relating to a second embodiment of the present invention. This color reproduction system consists of an image input unit 100 for photographing an image of an object, a color correcting section 220 for correcting the input image and generating an output image, and an image output unit 300.

In the color correcting section 220, an object recognizing section 221 recognizes an object within an input image. In other words, an area dividing section 221-1 of the object recognizing section 221 divides the input image into images of a plurality of areas. An input/output profile selecting section 221-2 selects a suitable input/output profile from among a plurality of input/output profiles for each divided area by changing over a switch 224. A device value converting section 222 has a memory unit for storing a plurality of input/output profiles 1 to N (2221 to 222N). The device value converting section 222 converts an image in each area into a device-independent color image by using an input/output profile that has been selected from among the plurality of input/output profiles 1 to N (2221 to 222N) by the input/output profile selecting section 221-2. An image combining section 223 combines the device-independent color images converted into images of divided areas into one device-independent color image.

Figure 7:
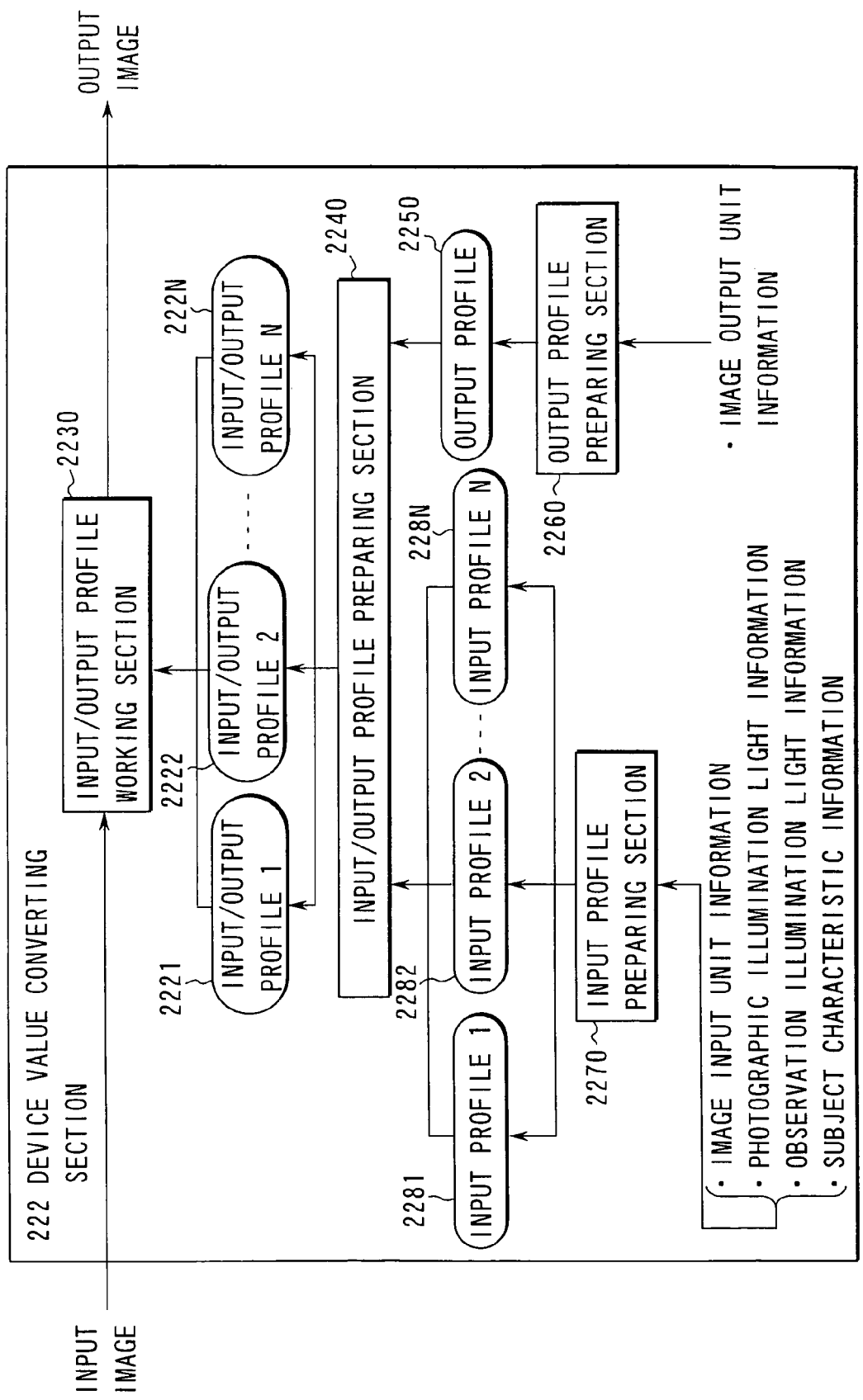
FIG. 7 is a diagram showing a detailed structure of a device value converting section 222.

FIG. 7 is a diagram showing a detailed structure of the device value converting section 222. The device value converting section 222 consists of an input profile 2281, 2282, 228N preparing section 2270 for calculating an input profile based on at least one set of information of characteristics and setting of an image input unit used for a photographing (image input unit information), spectrum data of an illumination light used for photographing an image of an object by the image input unit 100 (photographic illumination light information), spectrum data of an illumination light at a position where the image of the photographed object is to be observed (observation illumination light information), and statistical characteristics of a spectral reflectance of the photographed object (subject characteristic information), an output profile preparing section 2260 for calculating an output profile 2250 based on input information on an image output unit (image output unit information), an input/output profile preparing section 2240 for combining the prepared input profile and the output profile to prepare an input/output profile, and an input/output profile working section 2230 for working the prepared input/output profile onto the input image to convert the input image into an output image.

The use of an input/output profile prepared by combining the input profile and the output profile of the first embodiment makes it possible to convert the input image into a color-reproduced output image at a higher speed.

Figure 8:
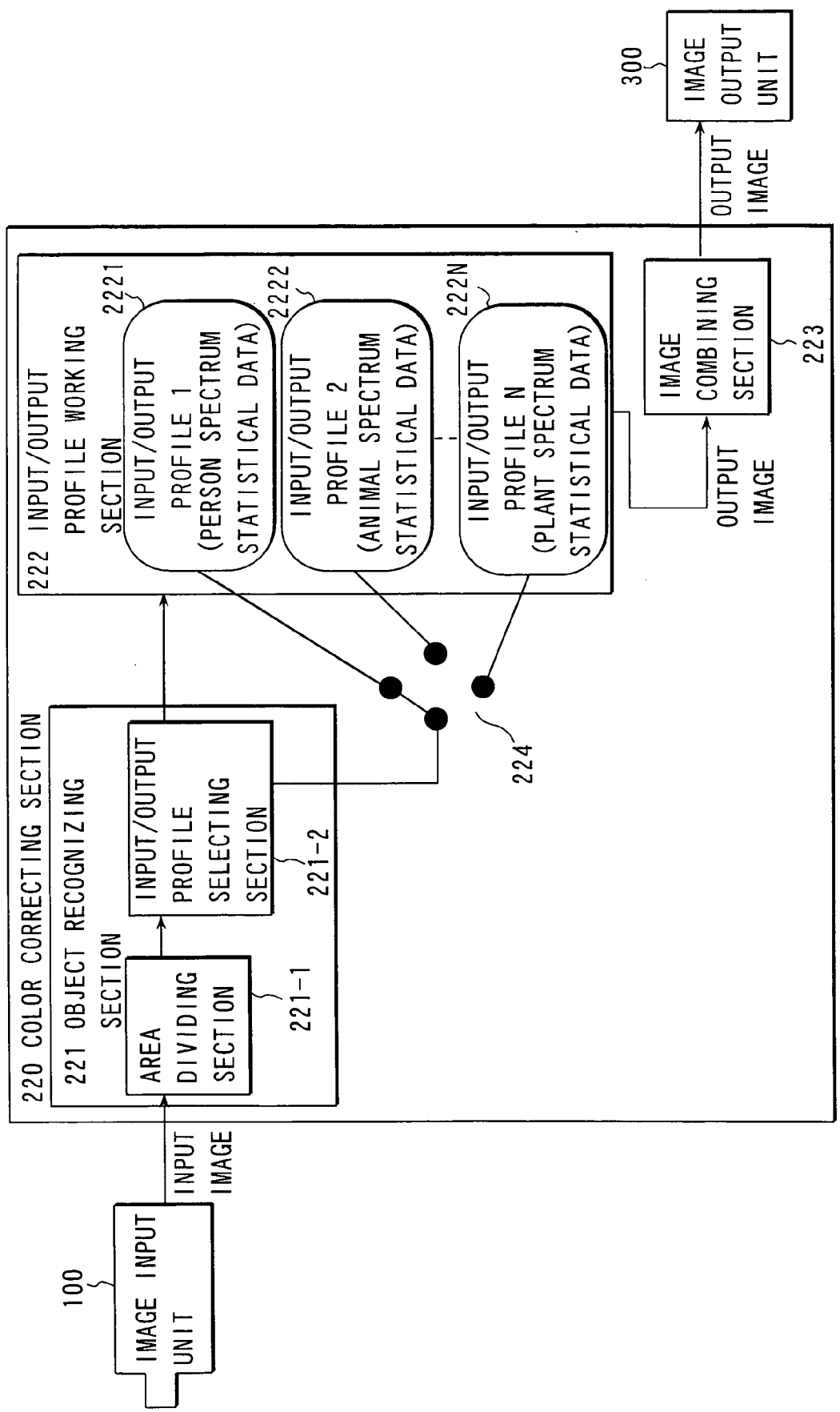
FIG. 8 is a diagram showing a structure of a modification of the second embodiment.

FIG. 8 shows a modification of the second embodiment. Usually, it is difficult to pick up an image of only a desired object in one picture. A background of the selected object and other objects are also included in the same picture. When colors of these objects are processed for reproduction by using only the input profile that uses characteristic information of one subject like the conventional method, it is possible to reproduce the colors of the desired object in high precision. However, colors of the background and other objects are not reproduced in high precision.

To solve this problem, a color correcting section 220 in FIG. 8 uses a plurality of input/output profiles 2221 to 222N that use characteristic information of various subjects including a person, an animal and a plant. An object recognizing section 221 decides what has been photographed in a certain area within the image based on a signal value of an input image, and selects a suitable input/output profile from among a plurality of input/output profiles. A input/output profile working section 222 works an input/output profile selected from among a plurality of input/output profiles 2221 to 222N onto the input image, thereby to prepare a device-independent color image.

Third Embodiment

Figure 9:
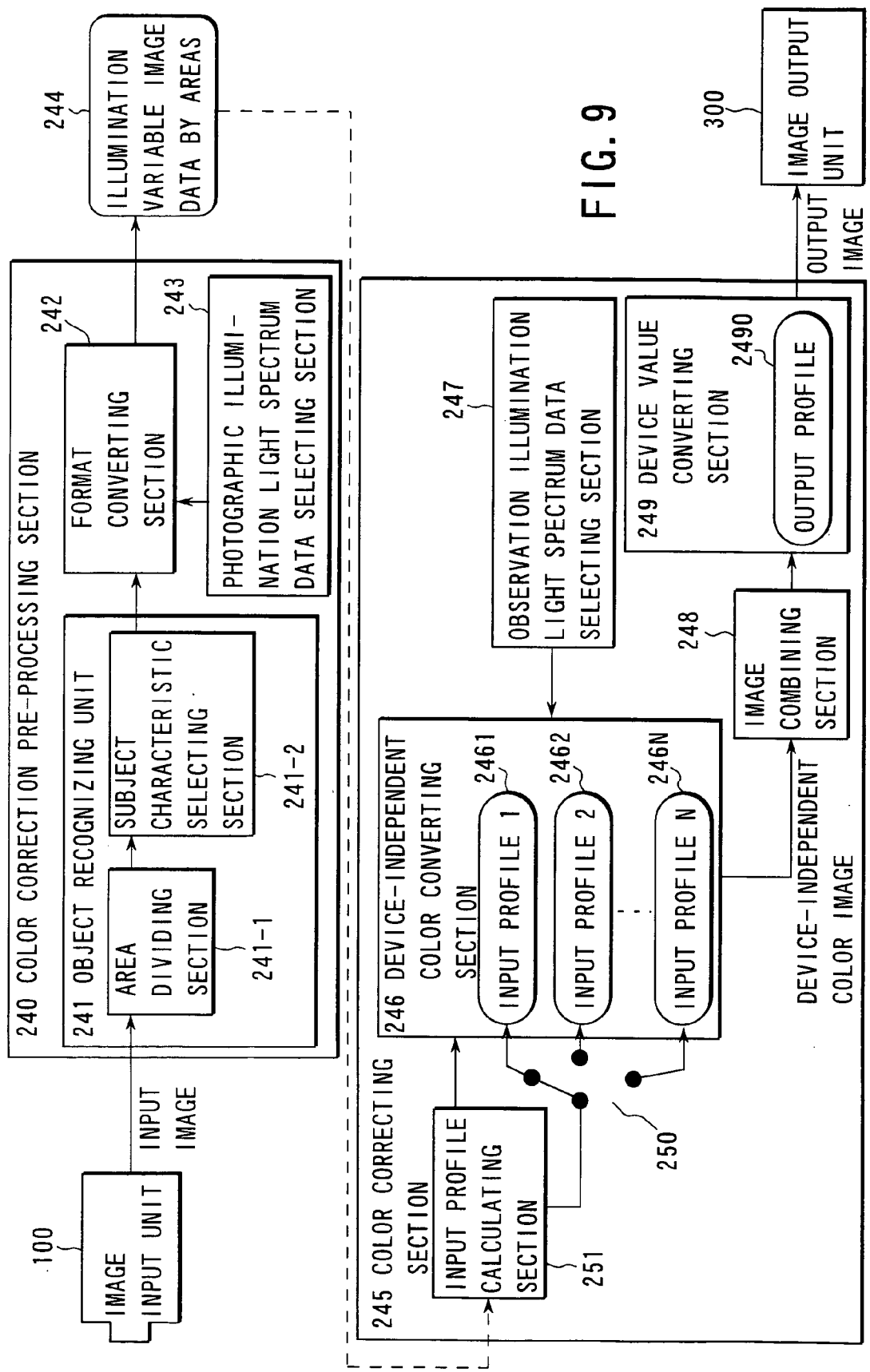
FIG. 9 is a diagram showing a structure of a color reproduction system relating to a third embodiment of the present invention.

FIG. 9 is a diagram showing a structure of a color reproduction system relating to a third embodiment of the present invention. This color reproduction system consists of an image input unit 100 for photographing an image of an object, a color correction pre-processing section 240 for converting an input image into illumination variable image data (illumination variable image data by areas) 244, a color correcting section 245 for preparing an input profile from the illumination variable image data, converting the input image into a device-independent color image, and then converting the device-independent color image into an output image that matches the image output unit, and the image output unit 300 for outputting (displaying and printing) an output image.

The third embodiment is characterized in that the input image has information necessary for preparing a plurality of input profiles, and has an illumination-variable data structure that uses an input profile according to each area within the image. In other words, the input image has the image data of a subject and any one set of the image input unit information, photographic illumination light information, observation illumination light information, and characteristic information of a plurality of subjects, that is necessary for preparing each input profile.

In the color correction pre-processing section 240, an area dividing section 241-1 of an object recognizing section 241 divides an input image into images of divided areas. A subject characteristic selecting section 241-2 selects a specific subject characteristic from among a plurality of subject characteristics included in the input image. A format converting section 242 carries out a format conversion based on a result of a selection by a photographic illumination light spectrum selecting section 243, and outputs a converted data as the illumination variable image data by areas 244.

In the color correcting section 245, an input profile calculating section 251 calculates an input profile from the illumination variable image data by areas. A device-independent color converting section 246 converts the illumination variable image data by areas 244 into a device-independent color image by using an input profile that has been selected from among a plurality of input profiles 1 to N (2461 to 246N) corresponding to the calculated input profile by changing over a switch 250. An observation illumination light spectrum data selecting section 247 is also provided, as shown. An image combining section 248 combines device-independent color images by areas into one device-independent color image. A device value converting section 249 converts the device-independent color image into an output image that matches the image output unit by using an output profile 2490.

Figure 10:
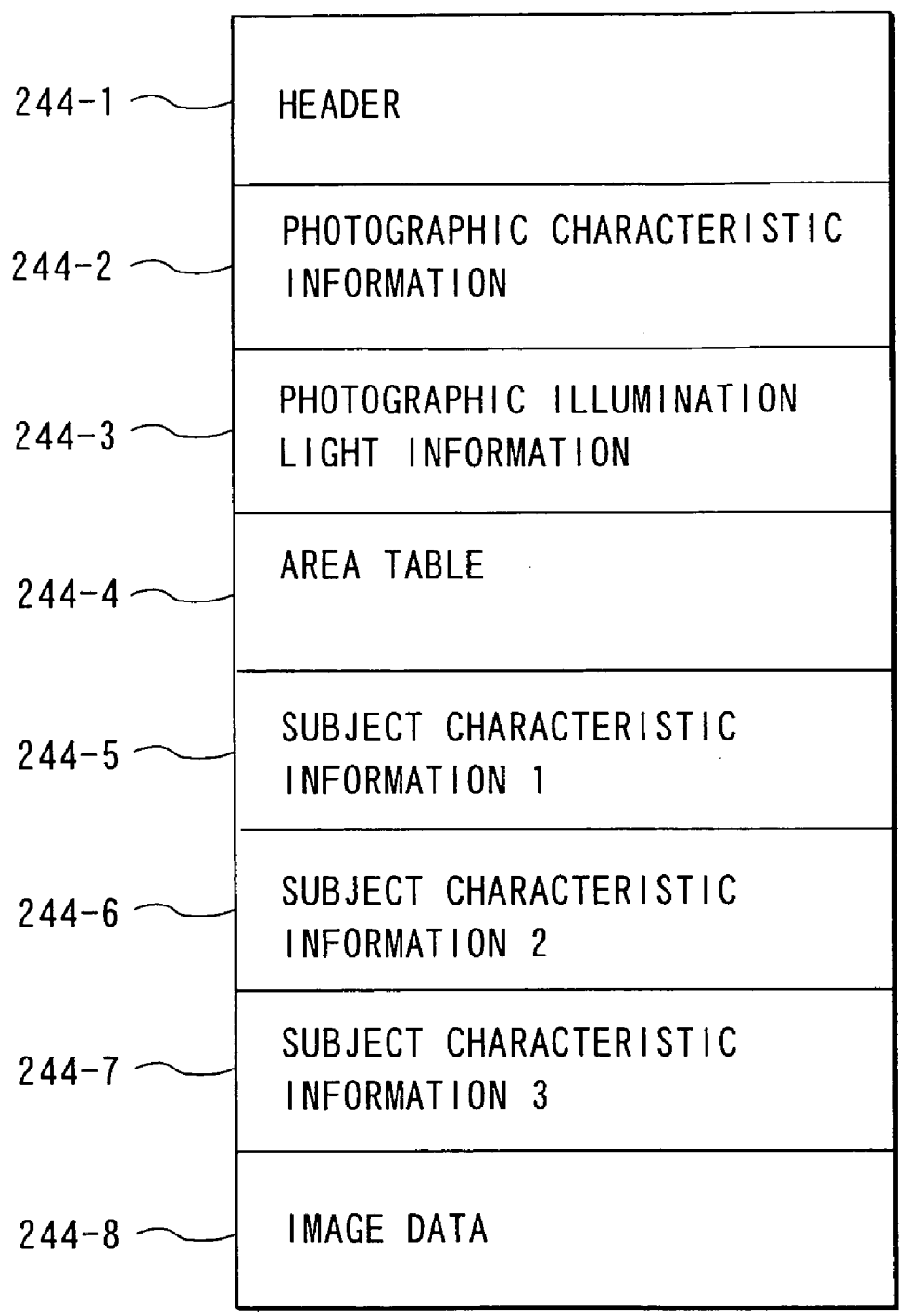
FIG. 10 is a diagram showing a format of illumination variable image data by areas 244.

FIG. 10 is a diagram showing a format of the illumination variable image data by areas 244. The illumination variable image data by areas 244 consists of a header 244-1 that includes information on a marker, a format version, a size of an image, number of dimensions of the image, number of areas of the image, etc., photographic characteristic information 244-2 that includes information on camera spectral sensitivity, photographing shutter speed, photographing diaphragm, etc., photographic illumination light information 244-3 that includes information on a starting wavelength, an ending wavelength, a wavelength interval, spectrum data, etc., an area table 244-4 that stores information on each area to which each pixel belongs (object spectrum statistical data to be used), subject characteristic information 1 (244-5) that includes information on an object base function and eigen value data 1, subject characteristic information 2 (244-6) that includes information on an object base function and eigen value data 2, subject characteristic information 3 (244-7) that includes information on an object base function and eigen value data 3, and image data 244-8 that includes data on monochromatic image×number of dimensions of the image. Although FIG. 10 shows data having the three sets of subject characteristic information, it is also possible to include more sets of subject characteristic information.

Fourth Embodiment

Figure 11:
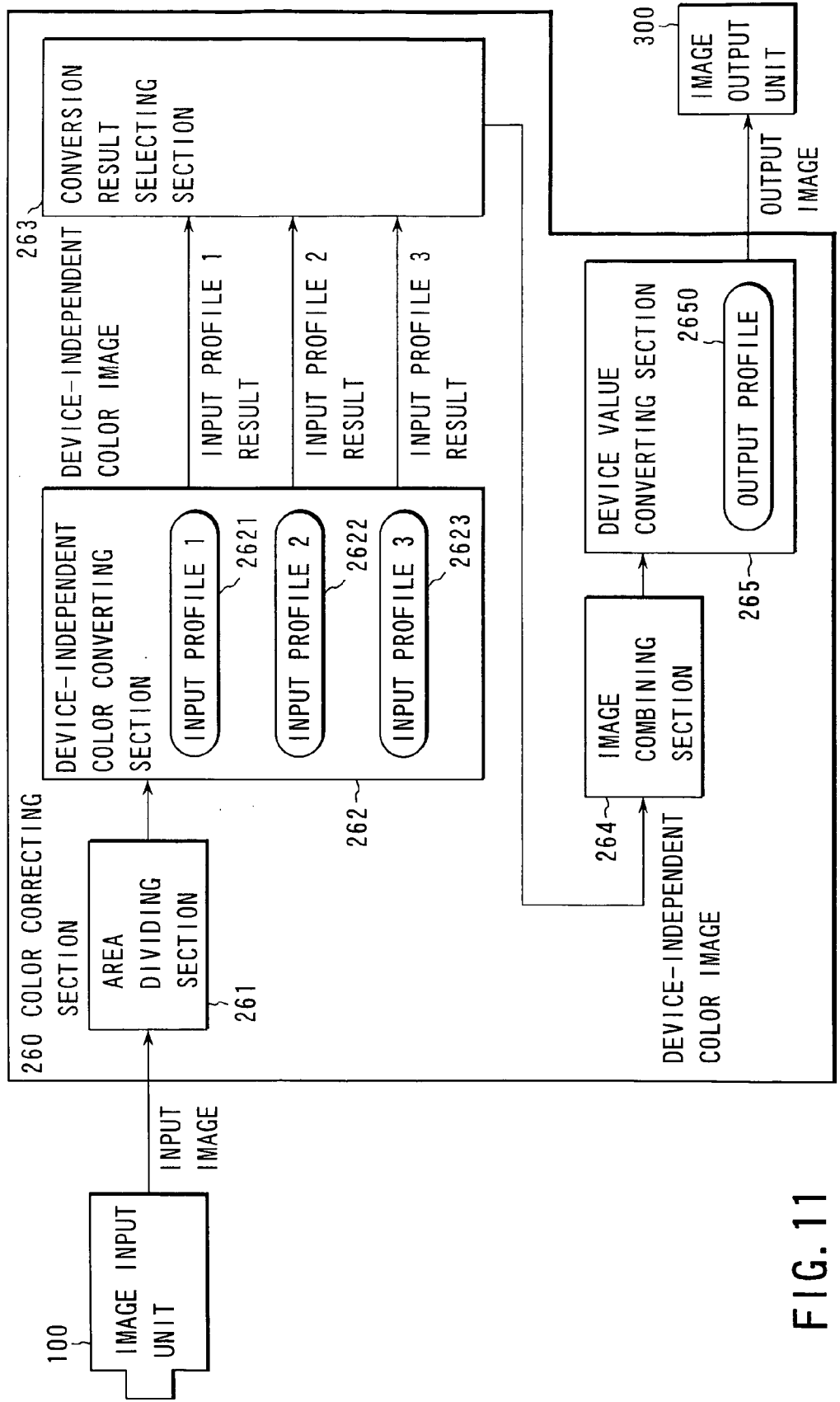
FIG. 11 is a diagram showing a structure of a color reproduction system relating to a fourth embodiment of the present invention.

FIG. 11 is a diagram showing a structure of a color reproduction system relating to a fourth embodiment of the present invention. The color reproduction system consists of an image input unit 100 for photographing an image of an object, a color correcting section 260, and an image output unit 300 for outputting (displaying and printing) an output image.

The fourth embodiment is characterized in that after an input image has been divided into images of a plurality of areas, the images in these areas are converted into device-independent color images in parallel by using a plurality of input profiles.

In the color correcting section 260, an area dividing section 261 divides an input image into images of a plurality of areas. A device-independent color converting section 262 converts image data for each area into a device-independent color image by using a plurality of input profiles 1 to 3 (2621 to 2623). A conversion result selecting section 263 compares between results 1, 2 and 3 of device-independent color images obtained by the conversion based on the plurality of input profiles, and selects one device-independent color image. An image combining section 264 combines device-independent color images that have been selected by areas into one device-independent color image.

A device value converting section 265 converts the device-independent color image into an output image that matches the image output unit by using an output profile 2650.

Figure 12:
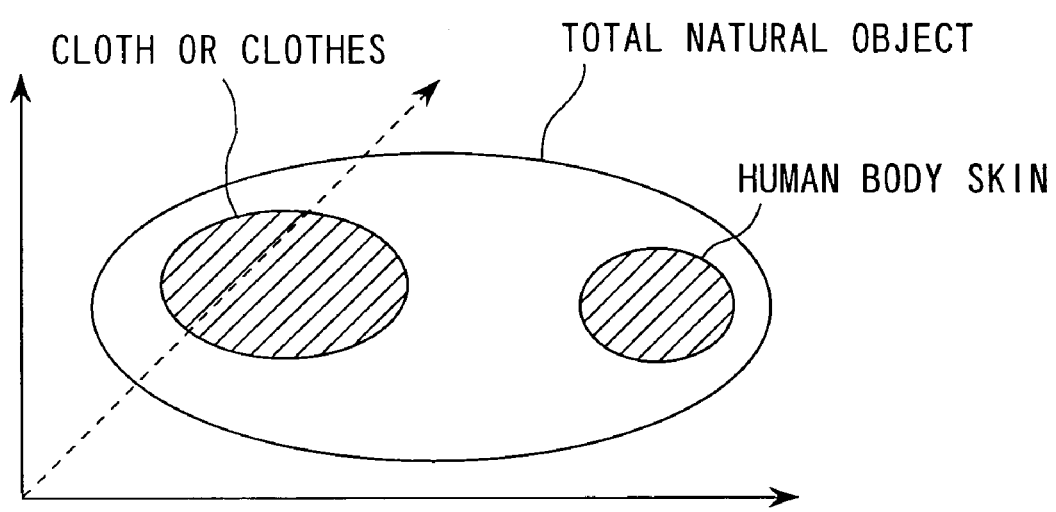
FIG. 12 is a diagram showing distributions of certain specific color spaces in a color space of various objects in a natural world.

Colors of a human body skin and a cloth of clothes form a limited small space in a total color space of various objects in the natural world, as shown in FIG. 12. Therefore, when colors of a specific subject are reproduced based on subject characteristic information that represents total objects in the natural world, there is small error in the reproduced colors. However, on the contrary, when colors of other objects are reproduced based on characteristic information of a certain specific subject, there arises a large error in the reproduced colors.

Figure 13:
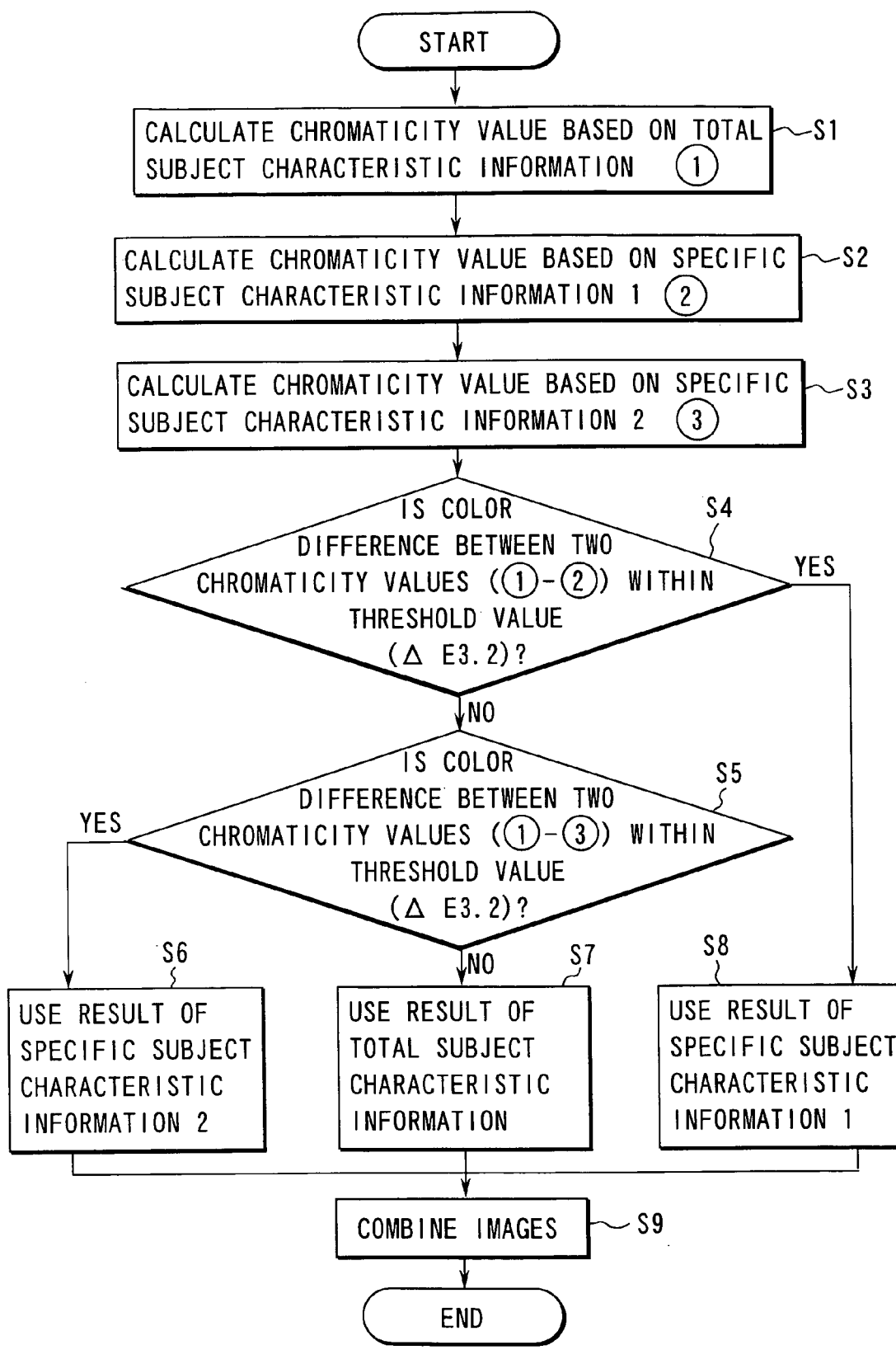
FIG. 13 is a flowchart showing details of an algorithm for carrying out a processing of the fourth embodiment.

FIG. 13 is a flowchart showing details of an algorithm for carrying out a processing of the fourth embodiment. A threshold value used in the following explanation is one example, and the threshold value is not limited to this example. A color difference 3.2 means a color difference in L*a*b* space. This is a difference between colors (color difference) that cannot be distinctly recognized as a different color by human beings when the object is in a distance. Although the three sets of subject characteristic information are used for processing them in parallel in the present embodiment, it is also possible to use more sets of subject characteristic information.

First, a chromaticity value is calculated based on total subject characteristic information (at step S1). Next, a chromaticity value is calculated based on specific subject characteristic information 1 (at step S2). Next, a chromaticity value is calculated based on specific subject characteristic information 2 (at step S3). A decision is made as to whether a color difference between the chromaticity value obtained at the step S1 and the chromaticity value obtained at the step S2 is within a threshold value ($\Delta$ E3.2) or not (at step S4). When a decision is YES, a result of the specific subject characteristic information 1 is used (at step S8), and images are combined together (at step S9).

When a decision made at the step S4 is NO, a decision is made as to whether a color difference between the chromaticity value obtained at the step S1 and the chromaticity value obtained at the step S3 is within the threshold value ($\Delta$ E3.2) or not (at step S5). When a decision is YES, a result of the specific subject characteristic information 2 is used (at step S6), and images are combined together (at step S9). When a decision made at the step S5 is NO, a result of the total subject characteristic information is used (at step S7), and images are combined together (at step S9).

Fifth Embodiment

Figure 14:
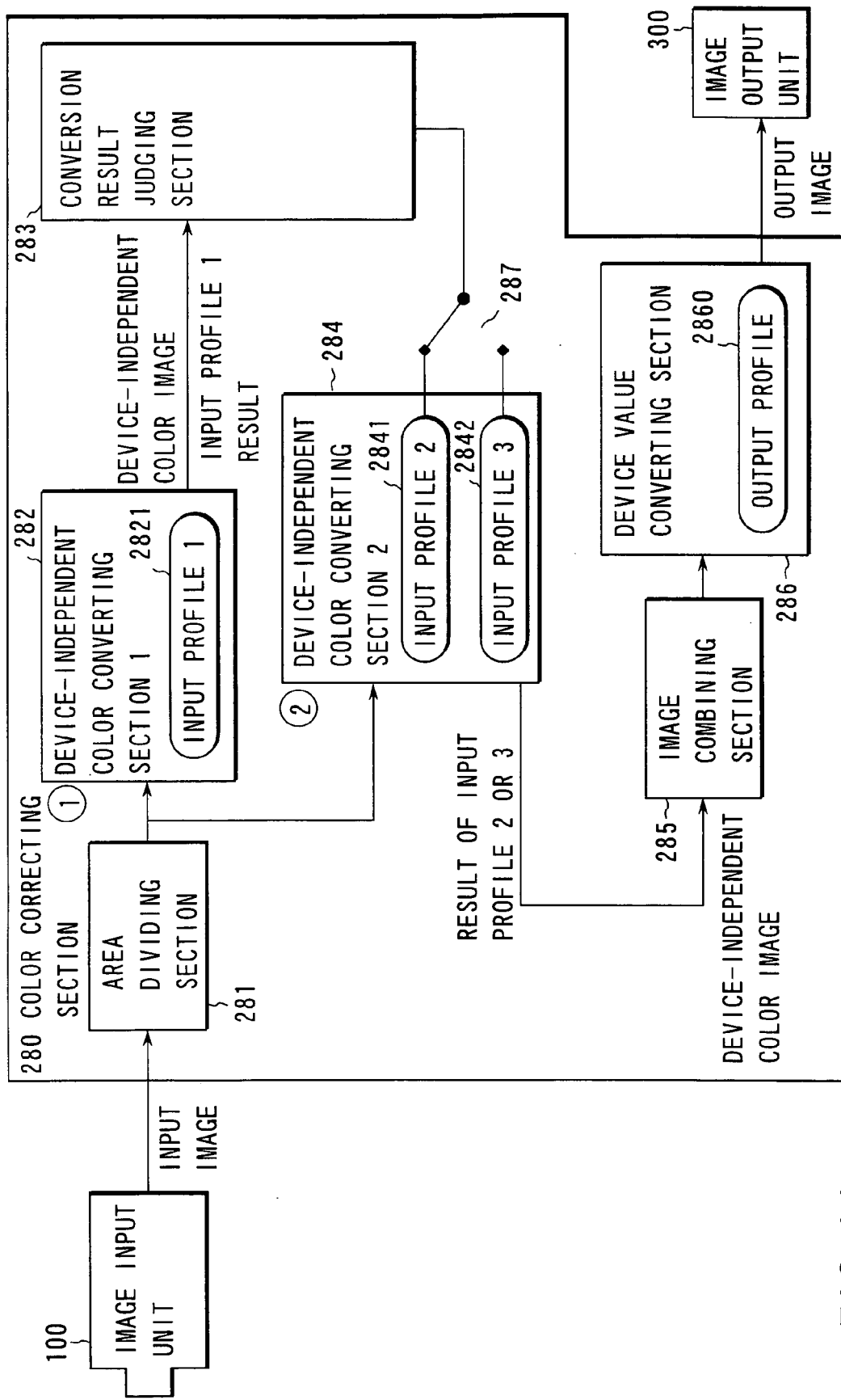
FIG. 14 is a diagram showing a structure of a color reproduction system relating to a fifth embodiment of the present invention.

FIG. 14 is a diagram showing a structure of a color reproduction system relating to a fifth embodiment of the present invention. This color reproduction system consists of an image input unit 100 for photographing an image of an object, a color correcting section 280 for correcting the input image and generating an output image, and an image output unit 300 for outputting (displaying and printing) an output image.

The fifth embodiment is characterized in that after an input image has been divided into images of a plurality of areas, the images in these areas are converted into device-independent color images in hierarchy by using a plurality of input profiles.

In the color correcting section 280, an area dividing section 281 divides an input image into images of a plurality of areas. A device-independent color converting section 1 (282) converts image data for each area into a device-independent color image by first using one input profile 1 (2821). A conversion result judging section 283 decides one input profile to be used from among the plurality of input profiles based on a result of the conversion by the device-independent color converting section 1 (282). A device-independent color converting section 2 (284) converts the input image divided into areas into device-independent color images again by using an input profile selected from input profiles 2 and 3 (2841 and 2842) by changing over a switch 287 according to a result of a decision made by the conversion result judging section 283. An image combining section 285 combines the device-independent color images by areas into one device-independent color image.

A device value converting section 286 converts the device-independent color image into an output image that matches the image output unit by using an output profile 2860.

Figure 15:
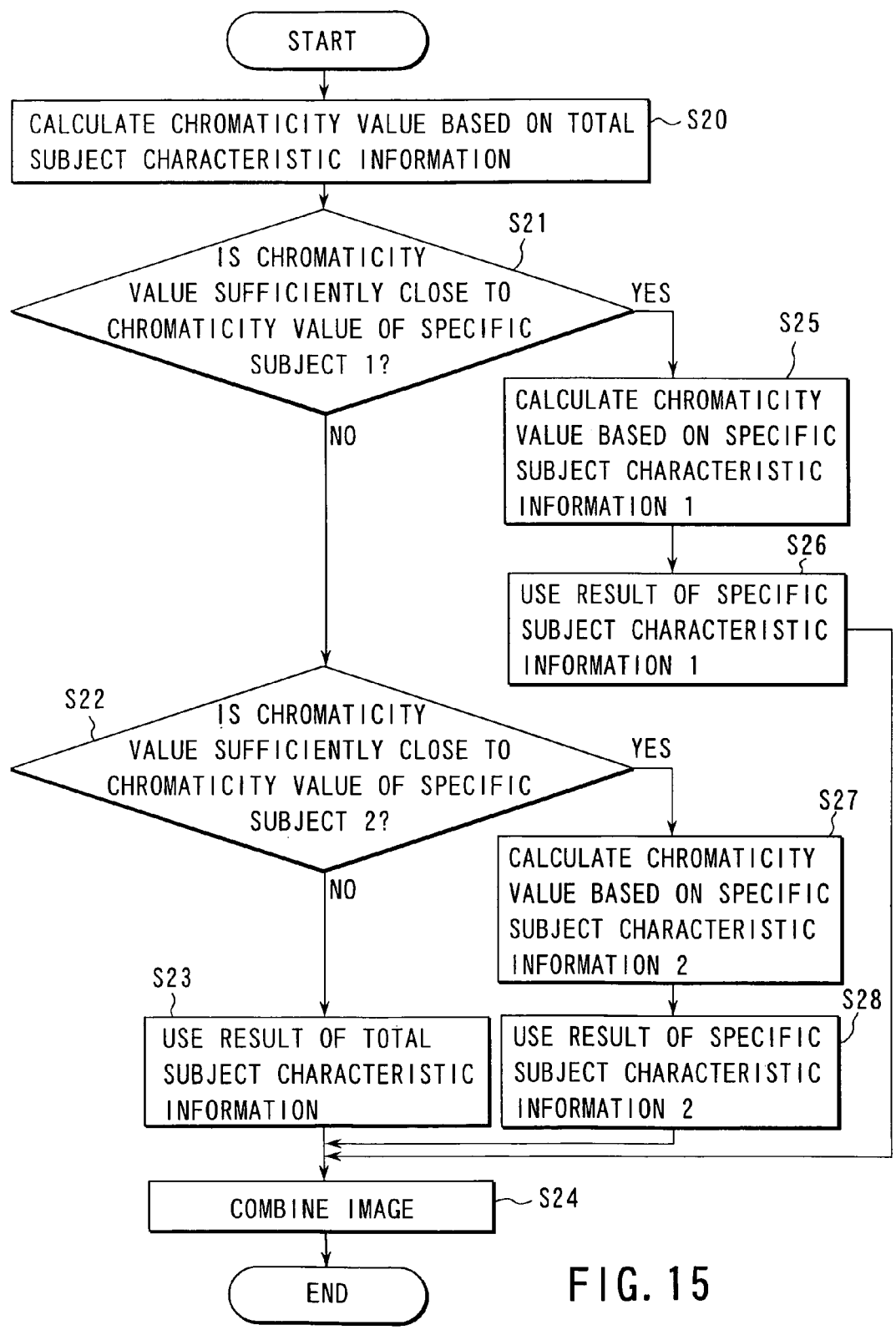
FIG. 15 is a flowchart showing details of an algorithm for carrying out a processing of the fifth embodiment.

FIG. 15 is a flowchart showing details of an algorithm for carrying out a processing of the fifth embodiment. First, a chromaticity value is calculated based on total subject characteristic information of natural objects (at step S20). A decision is made as to whether the chromaticity value obtained at the step S20 is sufficiently close to the chromaticity value of a specific subject 1 (for example, colors of a human body skin) (at step S21). When a decision is YES, a chromaticity value is calculated based on the specific subject characteristic information 1 (at step S25). Next, a result of the specific subject characteristic information 1 is used (at step S26), and images are combined together (at step S24).

When a decision made at the step S21 is NO, a decision is made as to whether the chromaticity value is sufficiently close to the chromaticity value of a specific subject 2 (at step S22). When a decision is YES, a chromaticity value is calculated based on the specific subject characteristic information 2 (at step S27). Next, a result of the specific subject characteristic information 2 is used (at step S28), and images are combined together (at step S24).

When a decision made at the step S22 is NO, a result of the total subject characteristic information is used (at step S23), and images are combined together (at step S24).

In other words, in the present embodiment, a chromaticity value is calculated based on the total subject characteristic information of natural objects. The conversion result judging section 283 checks whether the chromaticity value obtained is sufficiently close to the chromaticity value of the specific subject 1 (for example, colors of a human body skin) or the chromaticity value is sufficiently close to the chromaticity value of a specific subject 2 (for example, colors of cloth). When the chromaticity is sufficiently close to a certain specific subject, an area image is converted into a device-independent color image again by using an input profile calculated from the specific subject characteristic information according to this specific subject. In other cases, a result of a conversion using an input profile calculated based on the total subject characteristic information of natural objects is used.

In the present embodiment, there has been explained a case of carrying out image color conversion by using one set of total subject information and two sets of specific subject information. However, it is also possible to use more sets of subject information or to carry out a hierarchical conversion by dividing the process into more steps.

Sixth Embodiment

Figure 16:
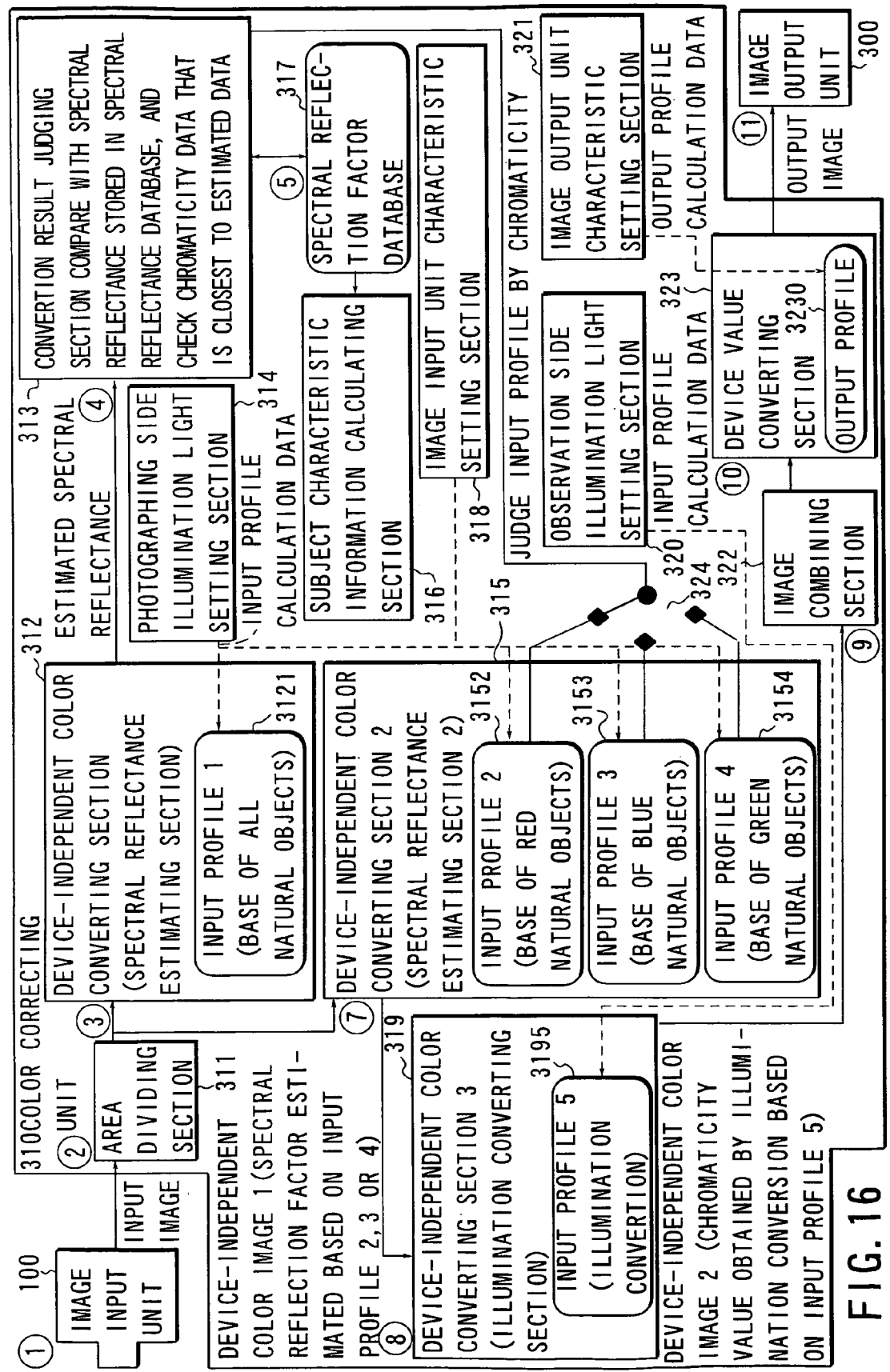
FIG. 16 is a diagram showing a structure of a color reproduction system relating to a sixth embodiment of the present invention.

FIG. 16 is a diagram showing a structure of a color reproduction system relating to a sixth embodiment of the present invention. This color reproduction system consists of an image input unit 100 for photographing an image of an object, a color correcting section 310 for correcting the input image and generating an output image, and an image output unit 300 for outputting (displaying and printing) an output image.

The present embodiment is characterized in that the color reproduction system has a spectral reflectance database, and obtains subject characteristic information for each input image by calculation based on spectral reflectance data.

In the color correcting section 310, an area dividing section 311 divides an input image into images of a plurality of areas. A device-independent color converting section 1 (312) as a spectral reflectance estimating section first converts image data for each area into a device-independent color image of an estimated spectral reflectance by referring to one input profile 1 (3121) as a base of all natural objects.

A conversion result judging section 313 compares a spectral reflectance database 317 in which spectral reflectances of various objects have been registered with the spectral reflectance stored in the spectral reflectance database 317 based on the result of the device-independent color converting section 1 (312), and checks chromaticity data that is closest to estimated data.

A subject characteristic information calculating section 316 selects data in the spectral reflectance database 317 based on the result of the conversion result judging section 313, calculates subject characteristic data, and inputs the calculated data to a device-independent color converting section 2 (315). A device-independent color converting section 2 (315) as a spectral reflectance estimating section 2 prepares an input profile 2 (a base of a red-color natural object) 3152, an input profile 3 (a base of a blue-color natural object) 3153, and an input profile 4 (a base of a green-color natural object) 3154, based on calculated subject characteristic data, and stores these files in a memory section. The device-independent color converting section 2 (315) converts the input image divided into areas into a device-independent color image 1 again by using a input profile selected from among the plurality of input profiles 2 to 4 (3152 to 3154) by changing over a switch 324 according to a decision made by the conversion result judging section 313. This is a spectral reflectance estimated by the input profile 2, 3 or 4.

The four input profiles 1 (3121), 2 (3152), 3 (3153) and 4 (3154) are prepared based on the setting of a photographing side illumination light setting section 314 and an image input unit characteristic setting section 318 and subject characteristic information calculated from data within a spectral reflectance DB.

A device-independent color converting section 3 (319) as an illumination converting section converts the device-independent color image 1 into a device-independent color image 2 as a chromaticity value obtained by illumination conversion based on an input profile 5 (illumination conversion) 3195, by referring to the input profile 5. The input profile 5 is prepared based on input profile calculation data from an observation side illumination light setting section 320.

An image combining section 322 combines input device-independent color images 2 by areas. A device value converting section 323 converts the combined image into an output image that matches the device by referring to an output profile 3230. The output profile 3230 is prepared based on output profile calculation data that is set from an image output unit characteristic setting section 321. The output image obtained by the device value converting section 323 is output to the image output unit 300.

The subject characteristic information may be either a correlation matrix or a base function that represents statistical characteristics of a spectral reflectance.

Seventh Embodiment

Figure 17:
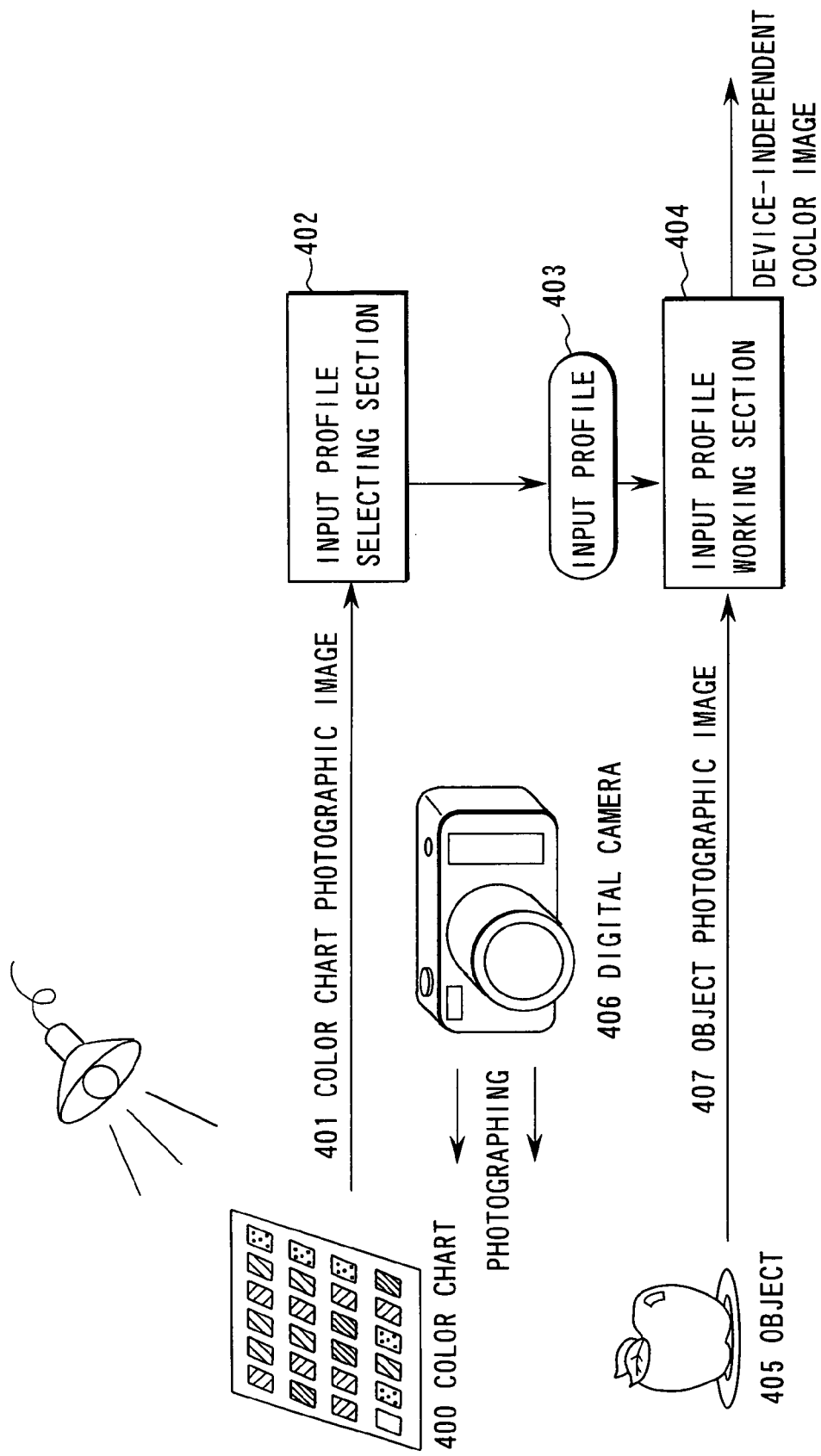
FIG. 17 is a diagram for explaining a seventh embodiment of the present invention.

FIG. 17 is a diagram for explaining a seventh embodiment of the present invention. According to the seventh embodiment, a digital camera 406 photographs a color chart 400 of a known spectral reflectance to form a color chart photographic image 401. The color chart photographic image 401 is input to an input profile selecting section 402. Based on a signal value of this image, an input profile 403 to be used for an illumination conversion of an object photographic image is selected and is input to an input profile working section 404. At the same time, an object photographic image 407 of an object 405 photographed by the digital camera 406 is input to the input profile working section 404. The input profile working section 404 works the input profile 403 onto the object photographic image 407 to convert the object photographic image into a device-independent color image.

Figure 18:
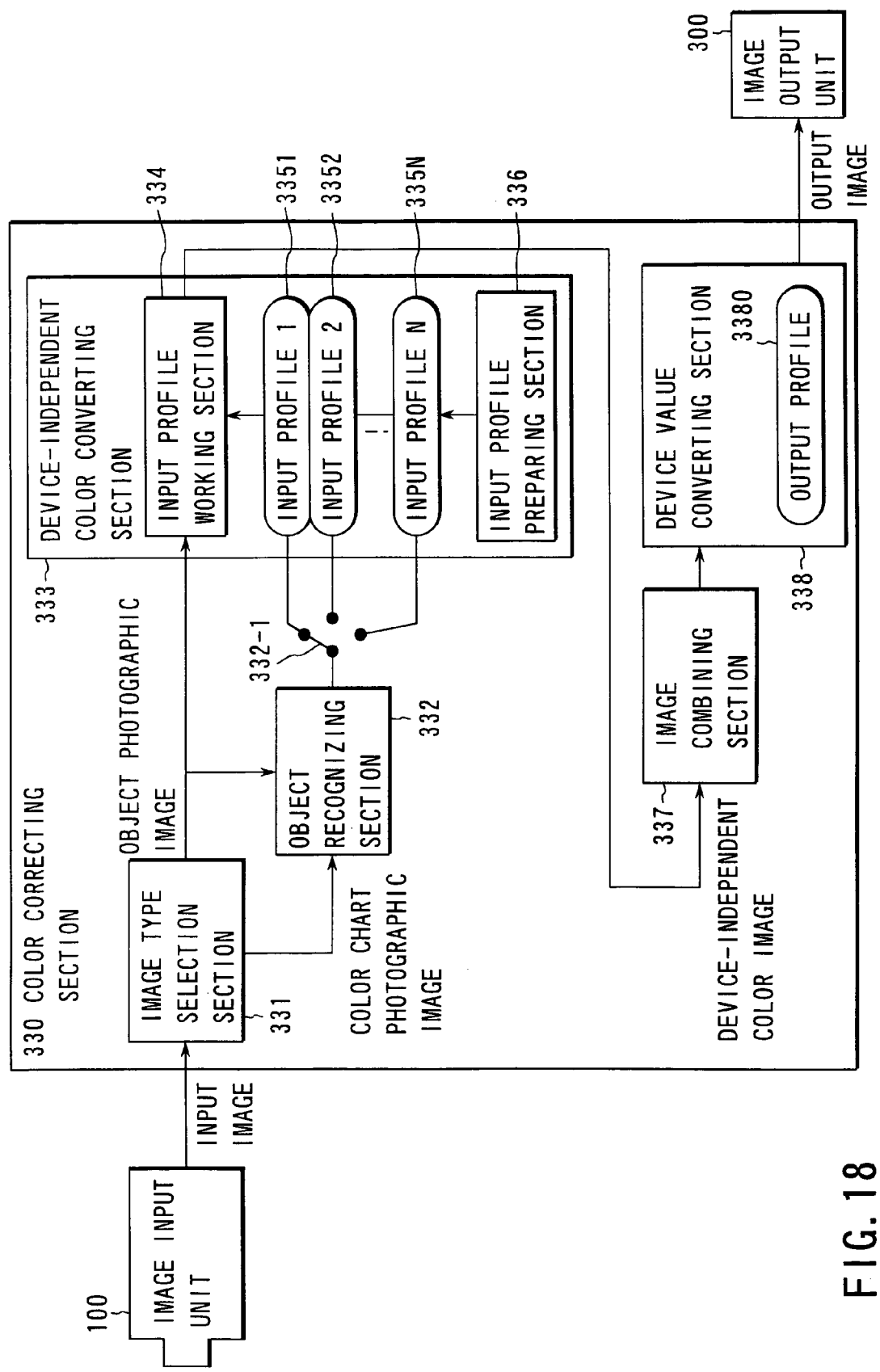
FIG. 18 is a diagram showing a structure of a color reproduction system relating to the seventh embodiment of the present invention.

FIG. 18 is a diagram showing a structure of a color reproduction system relating to the seventh embodiment of the present invention. This color reproduction system consists of an image input unit 100 for photographing an image of an object and an image of a color chart, a color correcting section 330, and an image output unit 300 for outputting (displaying and printing) an output image.

In the color correcting section 330, an image type selecting section 331 selects a type of an image. An object recognizing section 332 divides an object photographic image into images of a plurality of areas, and selects an input profile to be used from among a plurality of input profiles by referring to signal values of the color chart photographic image and the object photographic image. An input profile preparing section 336 in a device-independent color converting section 333 prepares a plurality of input profiles 3351 to 335N to be selected by the object recognizing section 332. An input profile working section 334 prepares a device-independent color image by working an input profile that has bee selected from among the plurality of input profiles 1 to N (3351 to 335N) by changing over a switch 332-1 onto the object photographic image. An image combining section 337 combines device-independent color images by areas into one device-independent color image. A device value converting section 338 converts the device-independent color image into an output image that matches the device by referring to an output profile 3380.

Figure 19:
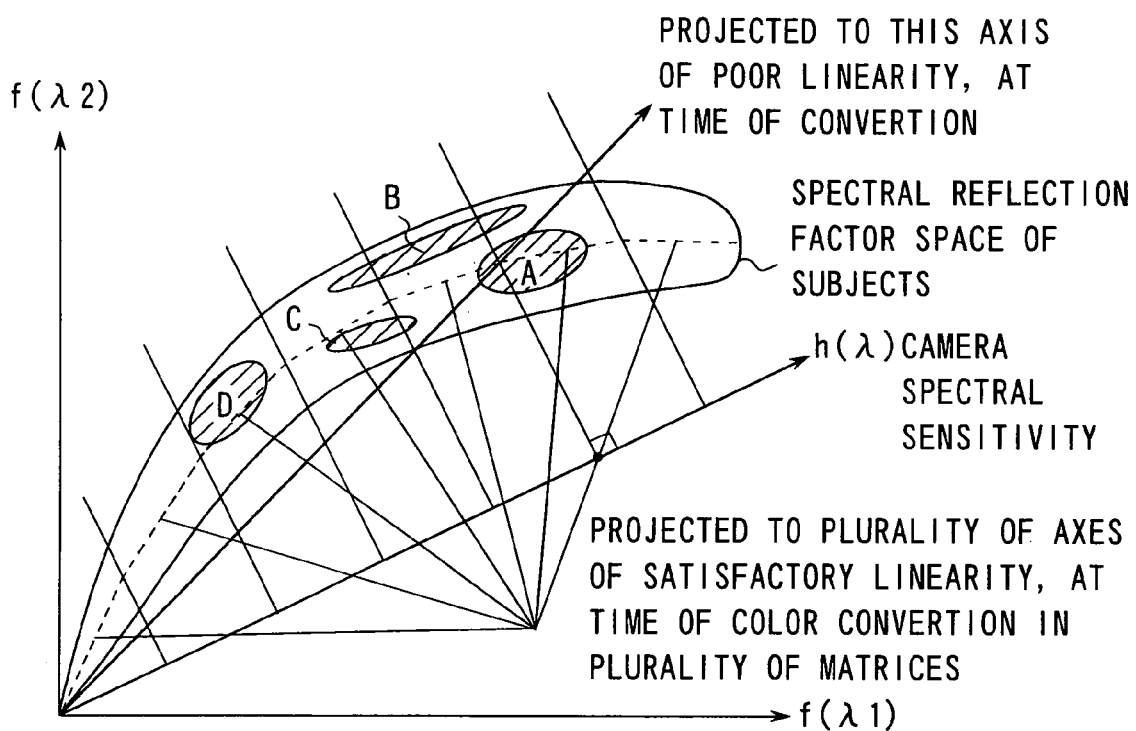
FIG. 19 is a diagram showing a distribution of a spectral reflectance space of a subject in a multi-dimensional space of a spectrum.

Assume that a spectral reflectance space of subjects is distributed in a multi-dimensional space of a spectrum as shown in FIG. 19. In this case, h ($\lambda$) represents a spectral sensitivity of a camera. On the spectral sensitivity of h ($\lambda$), a subject spectral reflectance that takes a value of a certain signal value represents all the points on a line perpendicular to h ($\lambda$).

When one conversion matrix is used like the conventional method, the spectral reflectance of a subject is projected to one axis of poor linearity, and thereafter the spectral reflectance is projected to the spectral sensitivity h ($\lambda$) of the camera. According to the present embodiment, the conversion matrix to be used is changed over depending on the signal value. Therefore, it is possible to project the spectral reflectance to a plurality of axes of satisfactory linearity. As a result, it is possible to obtain color reproduction in high precision.

Eighth Embodiment

Figure 20:
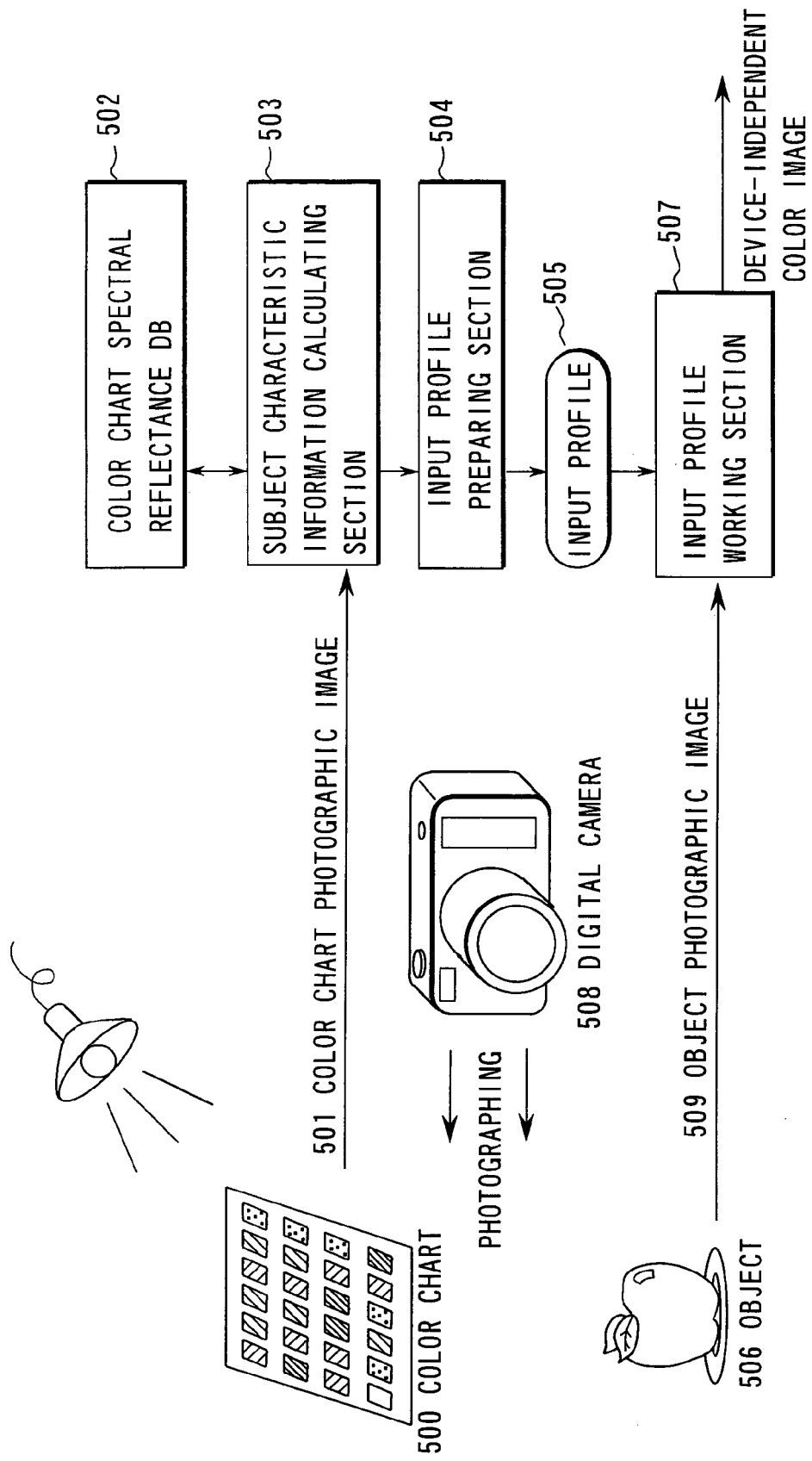
FIG. 20 is a diagram for explaining an eighth embodiment of the present invention.

FIG. 20 is a diagram for explaining an eighth embodiment of the present invention. According to the eighth embodiment, a digital camera 508 photographs a color chart 500 of a known spectral reflectance to form a color chart photographic image 501. The color chart photographic image 501 is input to a subject characteristic information calculating section 503. The subject characteristic information calculating section 503 calculates subject characteristic information based on data in a color chart spectral reflectance database (DB) 502. An input profile preparing section 504 prepares an input profile 505 for illumination-converting a subject photographic image 509 based on the subject characteristic information calculated. The subject photographic image 509 is obtained by photographing an object 506 by the digital camera 508. An input profile working section 507 works the input profile 505 onto the subject photographic image 509 to obtain and output a device-independent color image.

Figure 21:
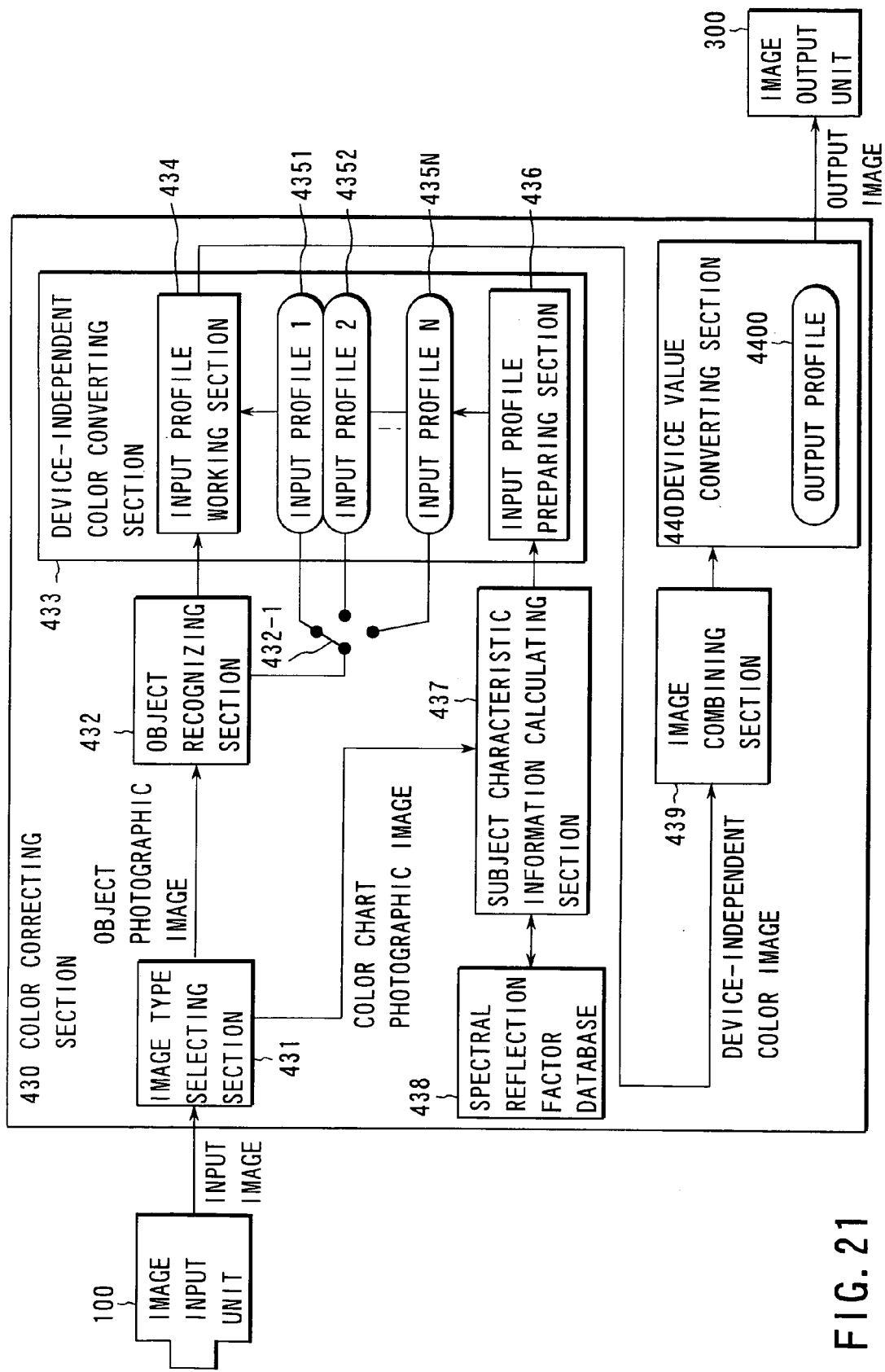
FIG. 21 is a diagram showing a structure of a color reproduction system relating to the eighth embodiment of the present invention.

FIG. 21 is a diagram showing a structure of a color reproduction system relating to the eighth embodiment of the present invention. This color reproduction system consists of an image input unit 100 for photographing an image of an object, a color correcting section 430, and an image output unit 300 for outputting (displaying and printing) an output image.

In the color correcting section 430, an image type selecting section 431 selects a type of an image. An object recognizing section 432 divides an object photographic image into images of a plurality of areas, and selects an input profile to be used from among a plurality of input profiles based on the object photographic image divided into areas. An input profile preparing section 436 in a device-independent color converting section 433 prepares a plurality of input profiles 1 to N (4351 to 435N) to be selected by the object recognizing section 432. In the present embodiment, the color correcting section 430 includes a subject characteristic information calculating section 437 for calculating subject characteristic information based on data in a spectral reflectance database 438 and giving this calculated information to the input profile preparing section 436.

An input profile working section 434 prepares a device-independent color image by working an input profile that has bee selected from among the prepared input profiles 1 to N (4351 to 435N) by changing over a switch 432-1 onto the object photographic image. An image combining section 439 combines device-independent color images by areas into one device-independent color image. A device value converting section 440 converts the combined device-independent color image into an output image that matches the device by referring to an output profile 4400.

According to the present embodiment, a signal value of the color chart photographic image is checked. When this signal value is closer to the signal value of the object photographic image, the subject characteristic information is calculated based on the spectral reflectance of this color chart. As subject characteristic is calculated for each input image without having the subject characteristic information, it is possible to carry out a color reproduction in high precision. The subject characteristic information may be a correlation matrix or a base function that represents statistical characteristics of a spectral reflectance.

Ninth Embodiment

A ninth embodiment of the present invention will be explained with reference to FIG. 22. The ninth embodiment is characterized in that a color reproduction is carried out by using a program that achieves an illumination conversion processing by areas as one function of an image processing software for a digital camera.

Figure 22:
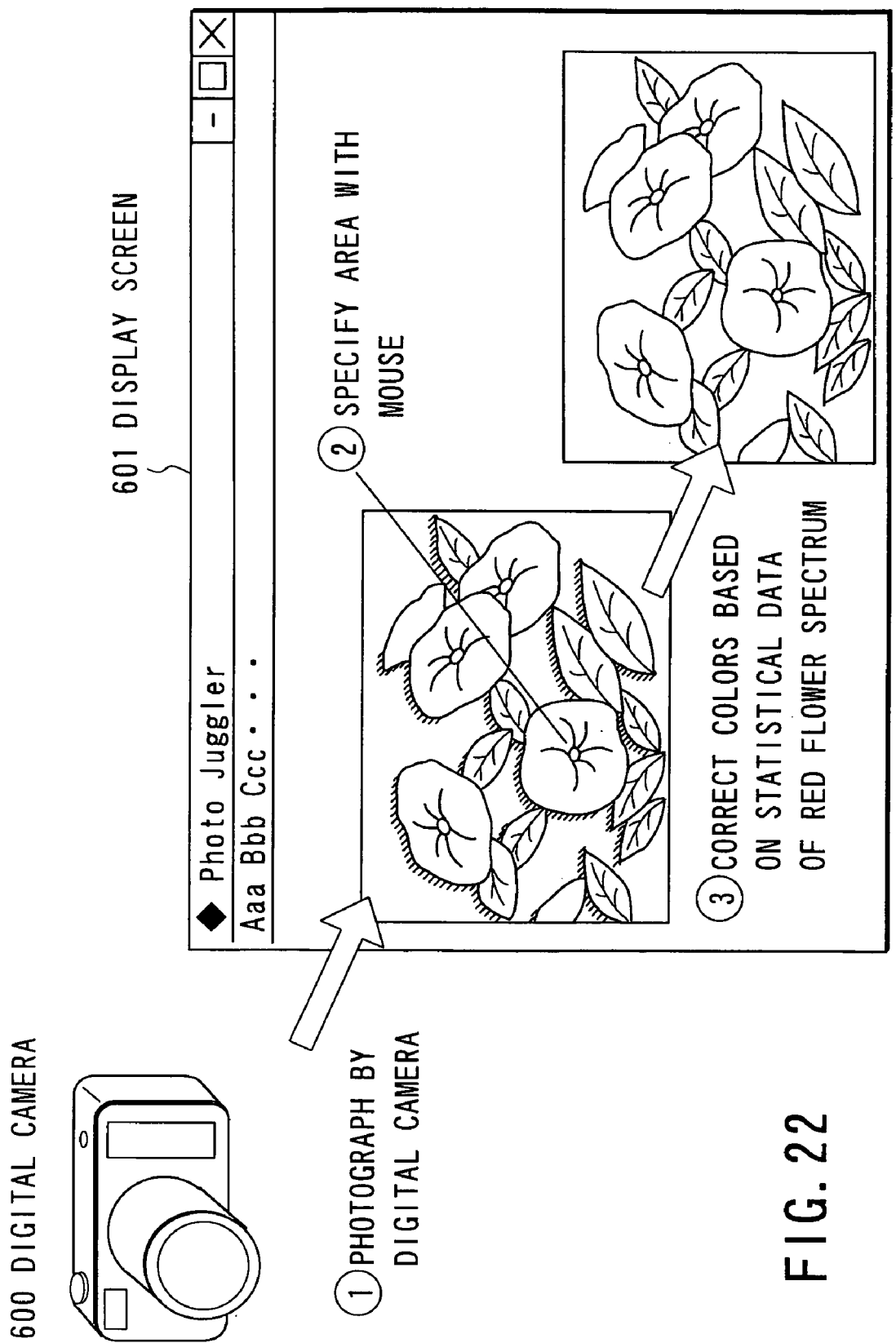
FIG. 22 is a diagram for explaining a ninth embodiment of the present invention.
Figure 23:
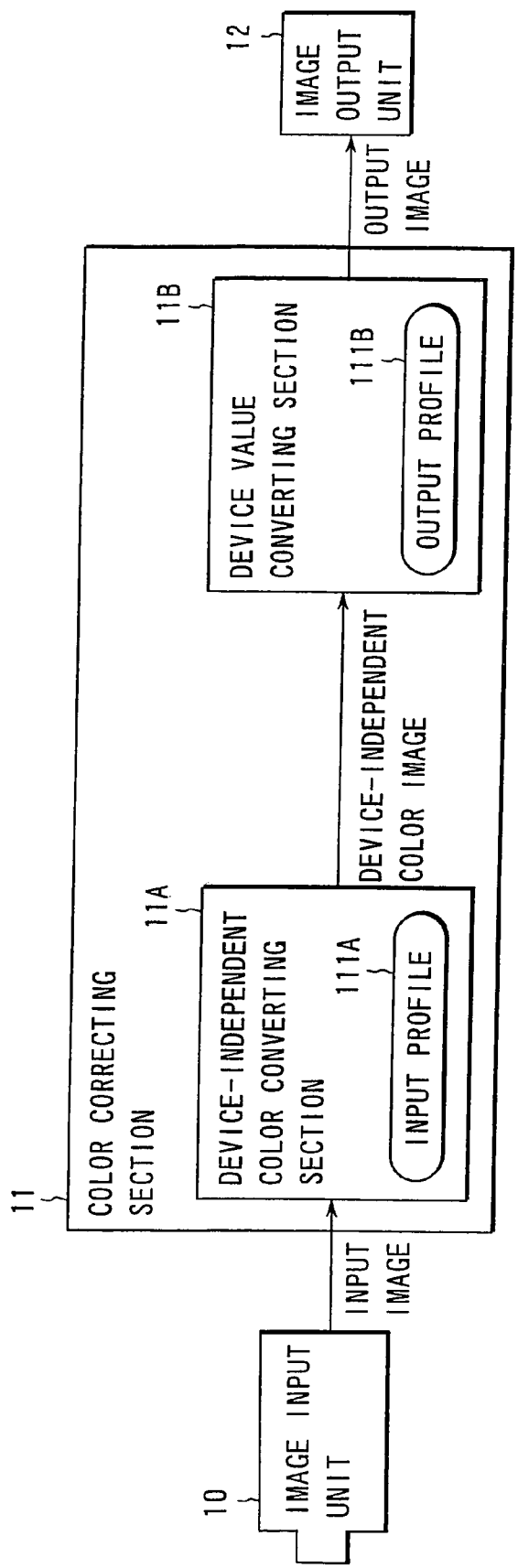
FIG. 23 is a diagram showing a structure of a conventional color reproduction system.

Referring to FIG. 22, an image file of an object obtained by photographing the object by a digital camera 600 is read. This image is displayed on a display screen 601, and a predetermined area of the image is designated with a mouse to divide the area. Alternately, the area may be divided automatically by using RGB value rates. Thereafter, a user carries out a suitable illumination conversion for each area within the image by selecting information of subject characteristic information, observation illumination information, etc. An area designation and an illumination conversion are carried out repeatedly on the image to achieve illumination conversion by areas. After that, images in all areas are combined into one image, thereby to achieve color correction in high precision.

According to the above-described first to ninth embodiments, an image is divided into images of a plurality of areas, and colors are converted suitably in each area. Therefore, it is possible to obtain a color reproduction system capable of carrying out color reproduction of all objects included in the image in high precision.

Further, as objects within the photographed image are recognized correctly and a suitable color conversion is carried out for each object, it is possible to obtain a color reproduction system capable of carrying out color reproduction in high precision.

Further, a color chart of a known spectral reflectance is photographed, and subject characteristic is calculated based on a spectral reflectance of a color chart closest to the signal value at the time of the photographing of an object. Therefore, it is possible to obtain a color reproduction system capable of carrying out color reproduction in high precision, without having subject characteristic information in advance.

Tenth Embodiment

Figures 24, 25:
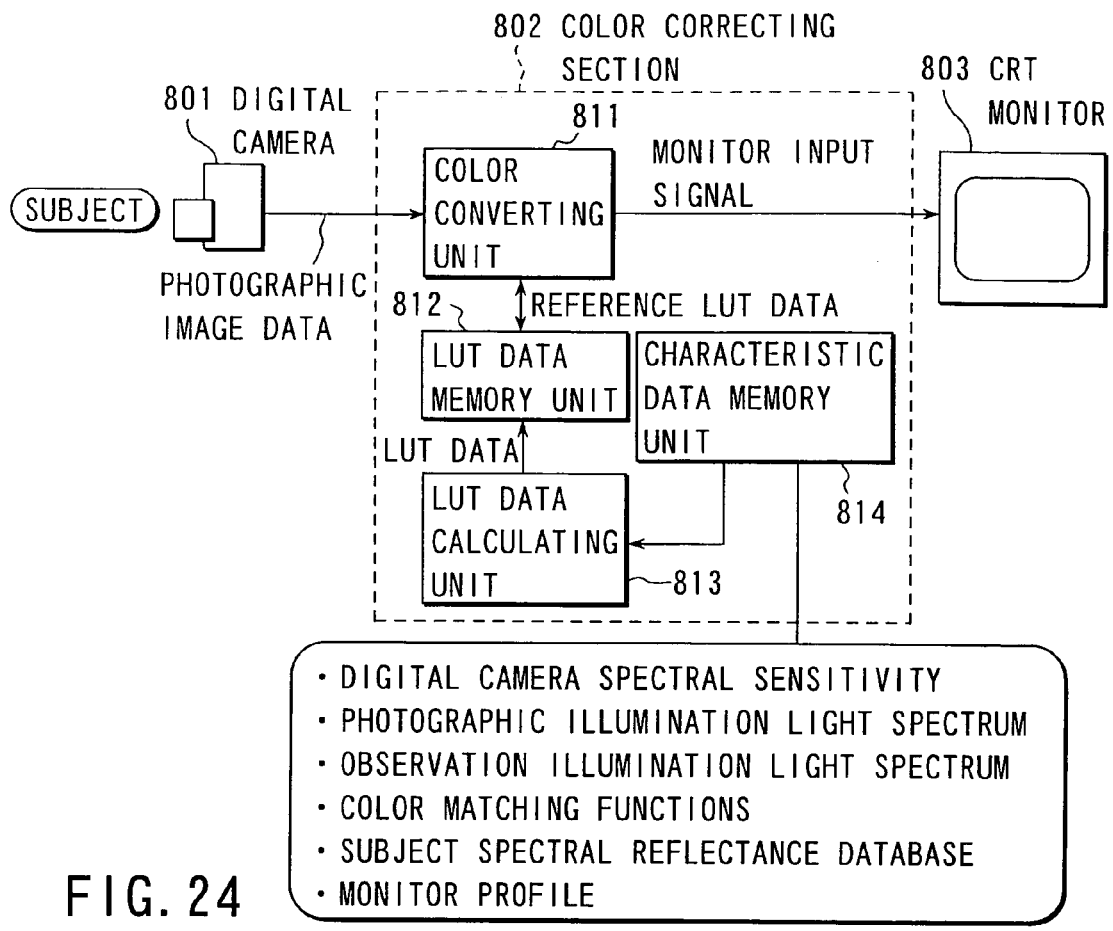
FIG. 24 is a block diagram showing a structure of a color reproduction system relating to a tenth embodiment of the present invention.
FIG. 25 is a diagram showing a detailed example of a subject spectral reflectance database in the tenth embodiment.

FIG. 24 shows a structure of a color reproduction system relating to a tenth embodiment of the present invention. This color reproduction system consists of a digital camera 801 as a color photographing section, a color correcting section 802 having a color estimating function, and a CRT monitor 803.

The digital camera 801 has three bands of red (R), green (G) and blue (B). The digital camera 801 photographs a subject, and outputs photographic image data (a subject photographic image) of three channels for each pixel, to the color correcting section 802. The photographic image data of each channel has a signal value of one byte (0 to 255). The color correcting section 802 converts the input photographic image data into a monitor input signal suitable for display in the CRT monitor 803, and outputs the converted signal to the CRT monitor 803. A subject image is displayed as a color image on the CRT monitor 803.

The color correcting section 802 consists of a color converting unit 811, an LUT data memory unit 812, an LUT data calculating unit 813, and a characteristic data memory unit 814.

Each unit of the color correcting section 802 will be explained in detail. First, the color converting unit 811 refers to data R', G' and B' in a lookup table (LUT) within the LUT data memory unit 812 by using RGB values as an address of the photographic image data that has been input from the digital camera 801. The color converting unit 811 then outputs the LUT data R', G' and B' as monitor input signals to the CRT monitor 803.

The LUT data memory unit 812 stores in advance LUT data calculated by the LUT data calculating unit 813. The LUT data consists of monitor input signals corresponding to all the signal values of the photographic image data, that is, R', G' and B' of $256^3$. R', G' and B' are one-byte data for each channel.

The LUT data calculating unit 813 inputs data including a spectral sensitivity of the digital camera 801 (hereinafter to be referred to as a digital camera spectral sensitivity), photographic illumination light spectrum, an observation illumination light spectrum, color matching functions, a subject spectral reflectance database, and a monitor profile from the characteristic data memory unit 814. The LUT data calculating unit 813 calculates the LUT data by using these data. Each data of the digital camera spectral sensitivity, the photographic illumination light spectrum, the observation illumination light spectrum, the color matching functions, the subject spectral reflectance database, and the monitor profile stored in the characteristic data memory unit 814 has the following construction.

The data of the digital camera spectral sensitivity consists of sensitivity data of r ($\lambda$), g ($\lambda$) and b ($\lambda$) each representing a spectral sensitivity of the digital camera 801 for colors R, G and B respectively that are set in 1 nm interval in a wavelength area of 380 nm to 780 nm.

Each data of the photographic illumination light spectrum and the observation illumination light spectrum consists of light intensity data Em ($\lambda$) and Eo ($\lambda$) of the photographic illumination light spectrum and the observation illumination light spectrum respectively set in 1 nm interval in a wavelength area of 380 nm to 780 nm.

The data of the color matching functions are color matching functions x ($\lambda$), y ($\lambda$) and z ($\lambda$) prescribed by the CIE. These data are interpolated to have data in 1 nm interval in a wavelength area of 380 nm to 780 nm.

The subject spectral reflectance database is a set of a large number of spectral reflectance data measured for objects in the real world. FIG. 25 shows an example of the subject spectral reflectance database. Each spectral reflectance data fi ($\lambda$) (i=1 to 1000) has spectral reflectance data in 1 nm interval in a wavelength area of 380 nm to 780 nm, and is managed by a registration number i. The spectral reflectance data fi ($\lambda$) registered in the subject spectral reflectance database includes data of objects photographed by the digital camera 801 such as, for example, a plant, a rock, a human skin, a color chart, a picture, a dye, a pigment, etc. The number of objects is assumed as 1000 in this embodiment. However, it is also possible to add data according to the need. The number of registration data is optional.

The monitor profile consists of a matrix M and gradation correction data T. The matrix M is a matrix having elements of XrYrZr, XgYgzg and XbYbZb as XYZ tristimulus values of display colors in input signals (255, 0, 0), (0, 255, 0) and (0, 0, 255) of the CRT monitor 3.

$$M = \begin{pmatrix} X_r X_g X_b \\ Y_r Y_g Y_b \\ Z_r Z_g Z_b \end{pmatrix}$$

The gradation data are table data $\gamma r$ (R), $\gamma g$ (G) and $\gamma b$ (B) that give a relationship of output luminance to each input signal of R, G and B of the CRT monitor 803. Each data is normalized to have a maximum value of 1.

Figure 26:
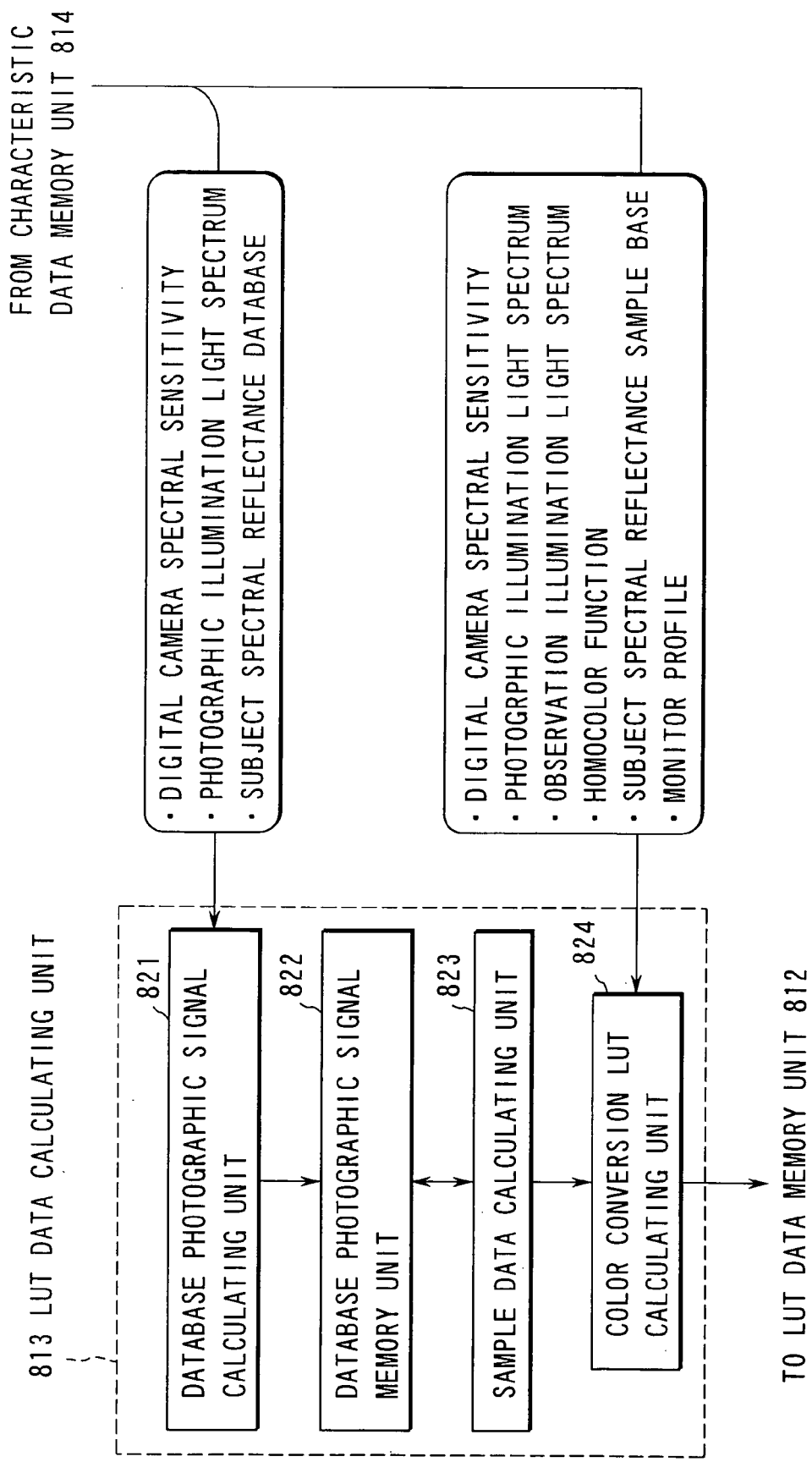
FIG. 26 is a block diagram showing a structure of an LUT data calculating unit in the tenth embodiment.

FIG. 26 shows a structure of the LUT data calculating unit 813. The LUT data calculating unit 813 consists of a database photographic signal calculating unit 821, a database photographic signal memory unit 822, a sample data calculating unit 823, and a color conversion LUT calculating unit 824. The database photographic signal calculating unit 821 reads all data of the digital camera spectral sensitivity, the photographic illumination light spectrum and the subject spectral reflectance database from the characteristic data memory unit 814 shown in FIG. 24, and calculates values of photographic signals RiGiBi for spectral reflectance data fi ($\lambda$) in the subject spectral reflectance database. The values of the photographic signals RiGiBi are estimated by the following equations.

$$R_i = \int_{\lambda=380}^{780} r(\lambda) E_m(\lambda) f_i(\lambda) d\lambda$$

$$G_i = \int_{\lambda=380}^{780} g(\lambda) E_m(\lambda) f_i(\lambda) d\lambda$$

$$B_i = \int_{\lambda=380}^{780} b(\lambda) E_m(\lambda) f_i(\lambda) d\lambda$$

Figures 27, 28:
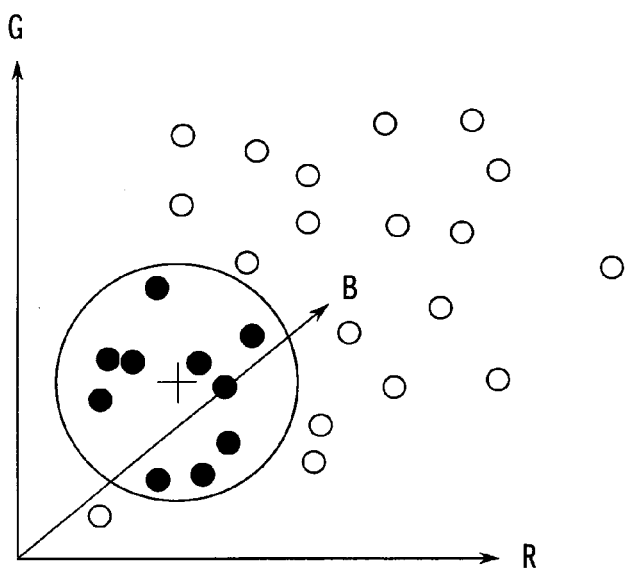
FIG. 27 is a diagram showing a detailed example of a database photographic signal in the tenth embodiment.
FIG. 28 is a conceptual diagram for explaining sample photographic signals and a selection of a nearest photographic signal in the tenth embodiment.

The values of the photographic signals RiGiBi are stored in the database photographic signal memory unit 822 together with the registration numbers i of the corresponding spectral reflectance data fi ($\lambda$) as shown in FIG. 27. The sample data calculating unit 823 selects ten photographic signals RiGiBi in the small to large order of a distance Di from a predetermined sample photographic signal RsGsBs judged by the following expression. The sample data calculating unit 823 then outputs the registration numbers i and the sample photographic signal RsGsBs to the color conversion LUT calculating unit 824.

$$D_i = \sqrt{(R_s - R_i)^2 + (G_s - G_i)^2 + (B_s - B_i)^2}$$

FIG. 28 shows a concept of the sample photographic signal RsGsBs and a selection of the ten photographic signals RiGiBi nearest to the sample photographic signal. A mark of + shows the sample photographic signal RsGsBs, and black marks show the ten photographic signals RiGiBi nearest to the sample photographic signal.

Figure 29:
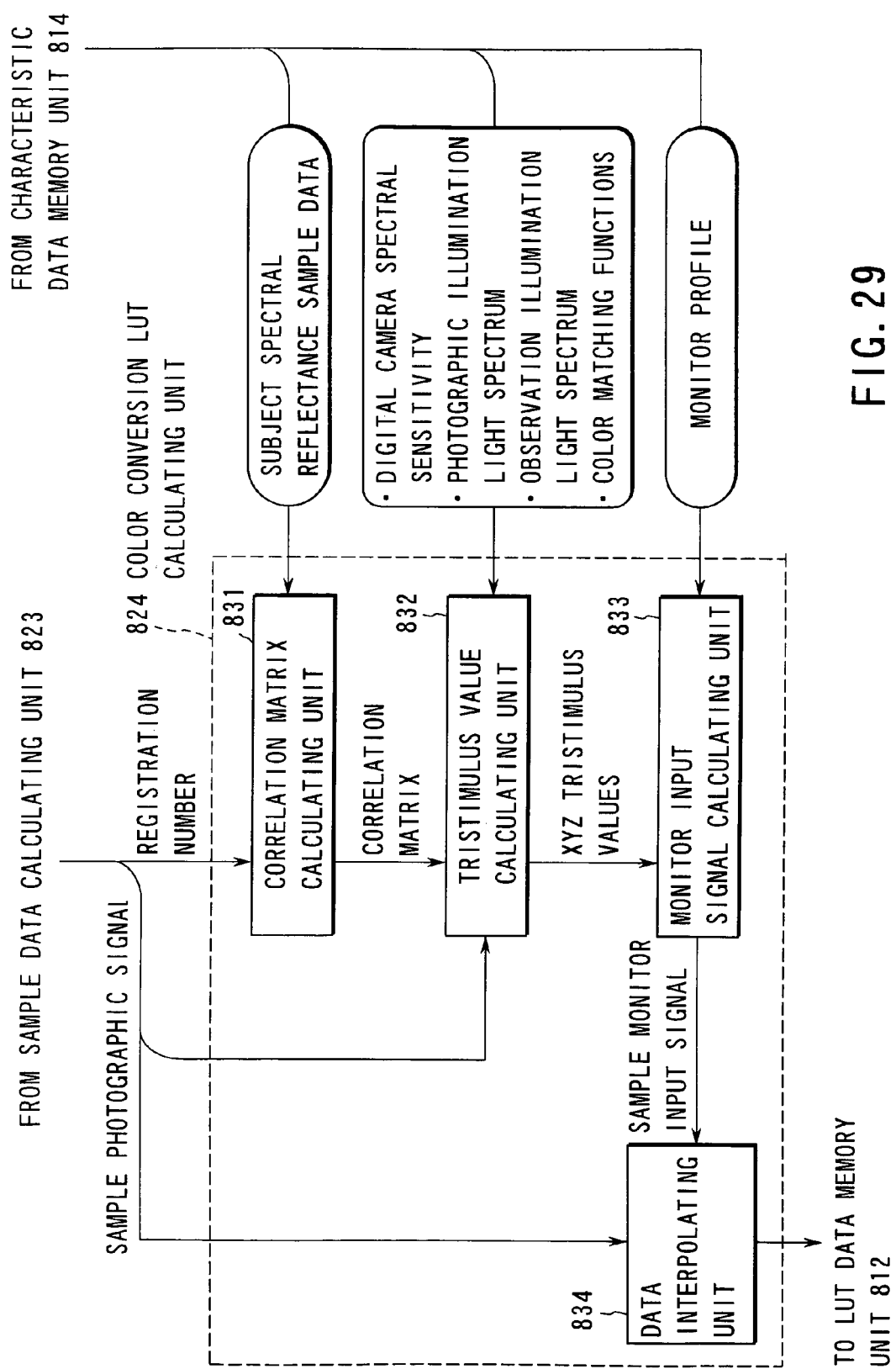
FIG. 29 is a block diagram showing a structure of a color conversion LUT calculating unit in FIG. 26.

FIG. 29 shows a structure of the color conversion LUT calculating unit 824. The color conversion LUT calculating unit 824 consists of a correlation matrix calculating unit 831, a tristimulus value calculating unit 832, a monitor input signal calculating unit 833 and a data interpolating unit 834. The registration numbers i of the ten photographic signals RiGiBi selected by the sample data calculating unit 823 in FIG. 26 are input to the correlation matrix calculating unit 831. The correlation matrix calculating unit 831 inputs the subject spectral reflectance data of the registration numbers i as subject spectral reflectance sample data from the characteristic data memory unit 814 shown in FIG. 24, and calculates a correlation matrix A, as shown by the following expression, as statistical data of the spectral reflectance of the subject.

$$A = \begin{pmatrix} \langle f_i(380) f_i(380) \rangle \langle f_i(380) f_i(381) \rangle & \cdots & \langle f_i(380) f_i(780) \rangle \\ \langle f_i(381) f_i(380) \rangle \langle f_i(381) f_i(381) \rangle & \cdots & \langle f_i(381) f_i(780) \rangle \\ \vdots & & \vdots \\ \langle f_i(780) f_i(380) \rangle \langle f_i(780) f_i(381) \rangle & \cdots & \langle f_i(780) f_i(780) \rangle \end{pmatrix}$$

In the above expression, < > represents an average value of the ten spectral reflectance data.

The correlation matrix A calculated by the correlation matrix calculating unit 831 is output to the tristimulus value calculating unit 832. The tristimulus value calculating unit 832 calculates XYZ tristimulus values of the subject under the observation illumination light by the following expression based on the correlation matrix A input from the correlation matrix calculating unit 831, the digital camera spectral sensitivity, the photographic illumination light spectrum, the observation illumination light spectrum and the color matching functions input from the characteristic data memory unit 814 shown in FIG. 24, and the sample photographic signal RsGsBs input from the sample data calculating unit 823.

$$C = K_1 K_2^{-1} Q$$

where $$C = (XYZ)^t$$

$$Q = (R_s G_s B_s)^t$$

$$K_1 = \begin{pmatrix} \int_{\lambda=380}^{780} \int_{\lambda'=380}^{780} E_o(\lambda) x(\lambda) \langle f_i(\lambda) f_i(\lambda') \rangle E_m(\lambda) r(\lambda') d\lambda d\lambda' & \int_{\lambda=380}^{780} \int_{\lambda'=380}^{780} E_o(\lambda) x(\lambda) \langle f_i(\lambda) f_i(\lambda') \rangle E_m(\lambda) g(\lambda') d\lambda d\lambda' \\ & \int_{\lambda=380}^{780} \int_{\lambda'=380}^{780} E_o(\lambda) x(\lambda) \langle f_i(\lambda) f_i(\lambda') \rangle E_m(\lambda) b(\lambda') d\lambda d\lambda' \\ \int_{\lambda=380}^{780} \int_{\lambda'=380}^{780} E_o(\lambda) y(\lambda) \langle f_i(\lambda) f_i(\lambda') \rangle E_m(\lambda) r(\lambda') d\lambda d\lambda' & \int_{\lambda=380}^{780} \int_{\lambda'=380}^{780} E_o(\lambda) y(\lambda) \langle f_i(\lambda) f_i(\lambda') \rangle E_m(\lambda) g(\lambda') d\lambda d\lambda' \\ & \int_{\lambda=380}^{780} \int_{\lambda'=380}^{780} E_o(\lambda) y(\lambda) \langle f_i(\lambda) f_i(\lambda') \rangle E_m(\lambda) b(\lambda') d\lambda d\lambda' \\ \int_{\lambda=380}^{780} \int_{\lambda'=380}^{780} E_o(\lambda) z(\lambda) \langle f_i(\lambda) f_i(\lambda') \rangle E_m(\lambda) r(\lambda') d\lambda d\lambda' & \int_{\lambda=380}^{780} \int_{\lambda'=380}^{780} E_o(\lambda) z(\lambda) \langle f_i(\lambda) f_i(\lambda') \rangle E_m(\lambda) g(\lambda') d\lambda d\lambda' \\ & \int_{\lambda=380}^{780} \int_{\lambda'=380}^{780} E_o(\lambda) z(\lambda) \langle f_i(\lambda) f_i(\lambda') \rangle E_m(\lambda) b(\lambda') d\lambda d\lambda' \end{pmatrix}$$

-continued $$K_2 = \begin{Bmatrix} \int_{\lambda=380}^{780}\int_{\lambda'=380}^{780} E_m(\lambda)r(\lambda)\langle f_i(\lambda)f_i(\lambda')\rangle E_m(\lambda)r(\lambda')d\lambda d\lambda' & \int_{\lambda=380}^{780}\int_{\lambda'=380}^{780} E_m(\lambda)r(\lambda)\langle f_i(\lambda)f_i(\lambda')\rangle E_m(\lambda)g(\lambda')d\lambda d\lambda' \\ & \int_{\lambda=380}^{780}\int_{\lambda'=380}^{780} E_m(\lambda)r(\lambda)\langle f_i(\lambda)f_i(\lambda')\rangle E_m(\lambda)b(\lambda')d\lambda d\lambda' \\ \int_{\lambda=380}^{780}\int_{\lambda'=380}^{780} E_m(\lambda)g(\lambda)\langle f_i(\lambda)f_i(\lambda')\rangle E_m(\lambda)r(\lambda')d\lambda d\lambda' & \int_{\lambda=380}^{780}\int_{\lambda'=380}^{780} E_m(\lambda)g(\lambda)\langle f_i(\lambda)f_i(\lambda')\rangle E_m(\lambda)g(\lambda')d\lambda d\lambda' \\ & \int_{\lambda=380}^{780}\int_{\lambda'=380}^{780} E_m(\lambda)g(\lambda)\langle f_i(\lambda)f_i(\lambda')\rangle E_m(\lambda)b(\lambda')d\lambda d\lambda' \\ \int_{\lambda=380}^{780}\int_{\lambda'=380}^{780} E_m(\lambda)b(\lambda)\langle f_i(\lambda)f_i(\lambda')\rangle E_m(\lambda)r(\lambda')d\lambda d\lambda' & \int_{\lambda=380}^{780}\int_{\lambda'=380}^{780} E_m(\lambda)b(\lambda)\langle f_i(\lambda)f_i(\lambda')\rangle E_m(\lambda)g(\lambda')d\lambda d\lambda' \\ & \int_{\lambda=380}^{780}\int_{\lambda'=380}^{780} E_m(\lambda)b(\lambda)\langle f_i(\lambda)f_i(\lambda')\rangle E_m(\lambda)b(\lambda')d\lambda d\lambda' \end{Bmatrix}$$

The XYZ tristimulus values calculated by the tristimulus value calculating unit 832 are output to the monitor input signal calculating unit 833. The monitor input signal calculating unit 833 converts the XYZ tristimulus values into a sample monitor input signal by using the monitor profile input from the characteristic data memory unit 814 shown in FIG. 24, and outputs the converted signal to the data interpolating unit 834.

Figures 30, 31:
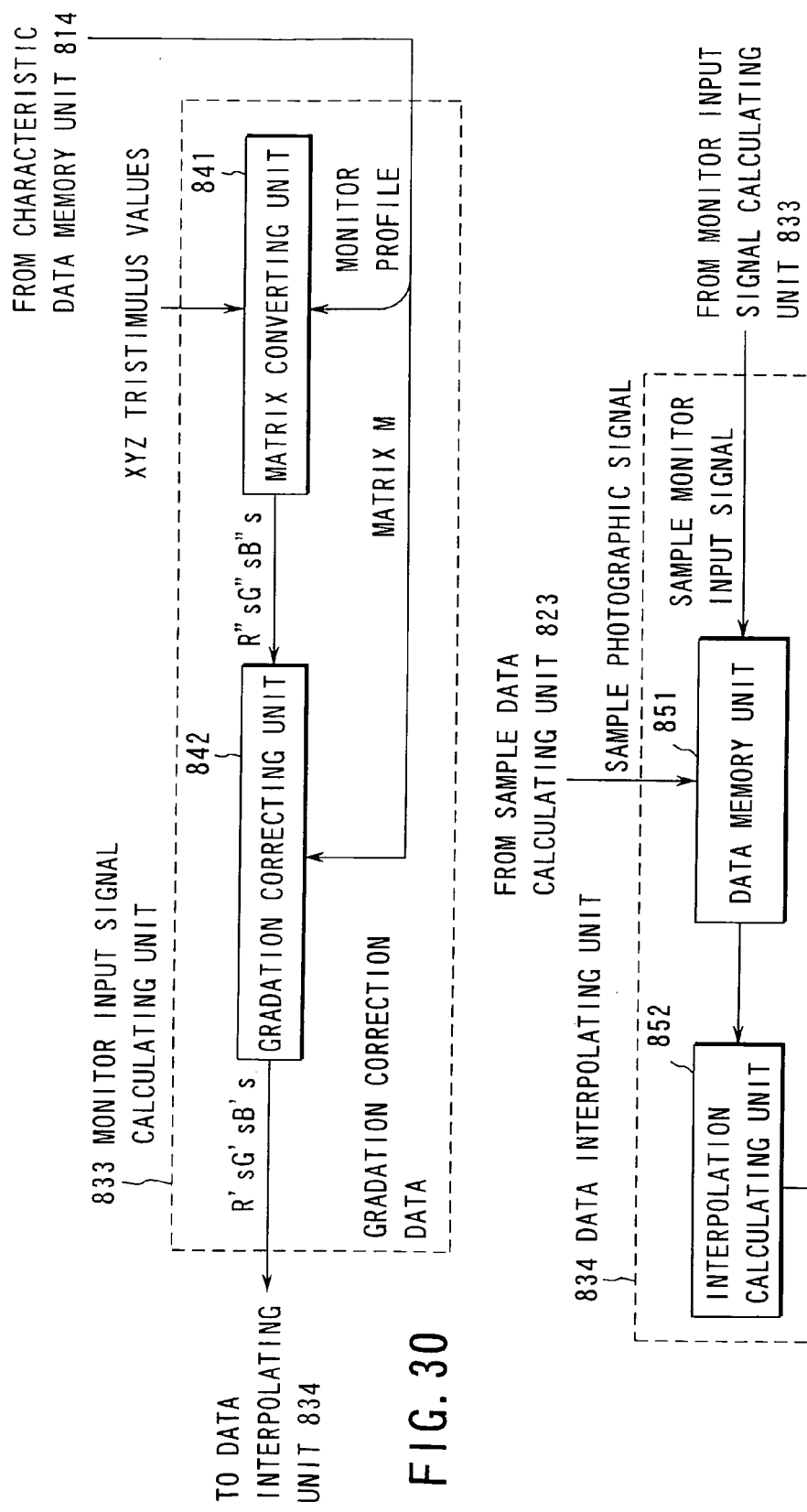
FIG. 30 is a block diagram showing a structure of a monitor input signal calculating unit in FIG. 29.
FIG. 31 is a block diagram showing a structure of a data interpolating unit in FIG. 29.

FIG. 30 shows a structure of the monitor input signal calculating unit 833. The monitor input signal calculating unit 833 consists of a matrix converting unit 841 and a gradation correcting unit 842.

The matrix converting unit 841 converts the XYZ tristimulus values input from the tristimulus value calculating unit 832 shown in FIG. 29 into R"sG"sB"s by the following expression based on the matrix M of the monitor profile input from the characteristic data memory unit 814 shown in FIG. 24. The matrix converting unit 841 outputs a result of the conversion to the gradation correcting unit 842.

$P = M^{-1}C$ where $P = (R_s" G_s" B_s")^t$

The gradation correcting unit 842 carries out a gradation correction of R"sG"sB"s input from the matrix converting unit 841 by the following expression based on an inverse function $\gamma^{-1}()$ of gradation correction data $\gamma()$ input from the characteristic data memory unit 814 shown in FIG. 24. The gradation correcting unit 842 outputs the gradation-corrected data as a sample monitor input signal R'sG'sB's to the data interpolating unit 834 shown in FIG. 29.

$R_s' = \gamma_r^{-1}(R_s")$ $G_s' = \gamma_g^{-1}(G_s")$ $B_s' = \gamma_b^{-1}(B_s")$ The gradation correcting unit 842 carries out the above gradation correction processing to the predetermined sample photographic signals RsGsBs, and stores the results as sample monitor input signals R'sG'sB's in the data interpolating unit 834. The data interpolating unit 834 obtains by interpolation a monitor input signal corresponding to the value of the photographic signal from among the sample photographic signals RsGsBs, and obtains LUT data having monitor input signal values corresponding to all the photographic signal values.

FIG. 31 shows a structure of the data interpolating unit 834. The data interpolating unit 834 consists of a data memory unit 851 and an interpolation calculating unit 852. The data memory unit 851 stores sample photographic signals input from the sample data calculating unit 823 shown in FIG. 26 and corresponding sample monitor input signal values input from the monitor input signal calculating unit 833 shown in FIG. 29. The interpolation calculating unit 852 carries out an interpolation for all the photographic signal values based on the sample photographic signals near the photographic signal and corresponding sample monitor input signals, thereby to obtain monitor input signals corresponding to the photographic signals. The interpolation-calculating unit 852 then outputs a result of the interpolation to the LUT data memory unit 812 shown in FIG. 24. The method of interpolation to be used is optional. For signal values that cannot be interpolated based on the sample photographic signals and for signals that are not within the range from 0 to 255, it is possible to cope with the situation by replacing signals by mapping to the near region.

According to the color reproduction system having the above-described structure of the present embodiment, the color correcting section 802 estimates tristimulus color values of subjects by using statistical data A (the correlation matrix A in this example) of the spectral reflectance of the subjects. Colors are estimated by changing over the correlation matrix A as the statistical data according to photographic signals of the subjects obtained by photographing the subjects by the digital camera 801. More specifically, the correlation matrix A is used by changing over the matrix according to the relationship between the spectral reflectance data fi ($\lambda$) for calculating the statistical data of the spectral reflectances and the subject photographic signals. With this arrangement, it is possible to estimate colors in higher precision than when the same statistical data is used for all the subject photographic signals.

Eleventh Embodiment

Figure 32:
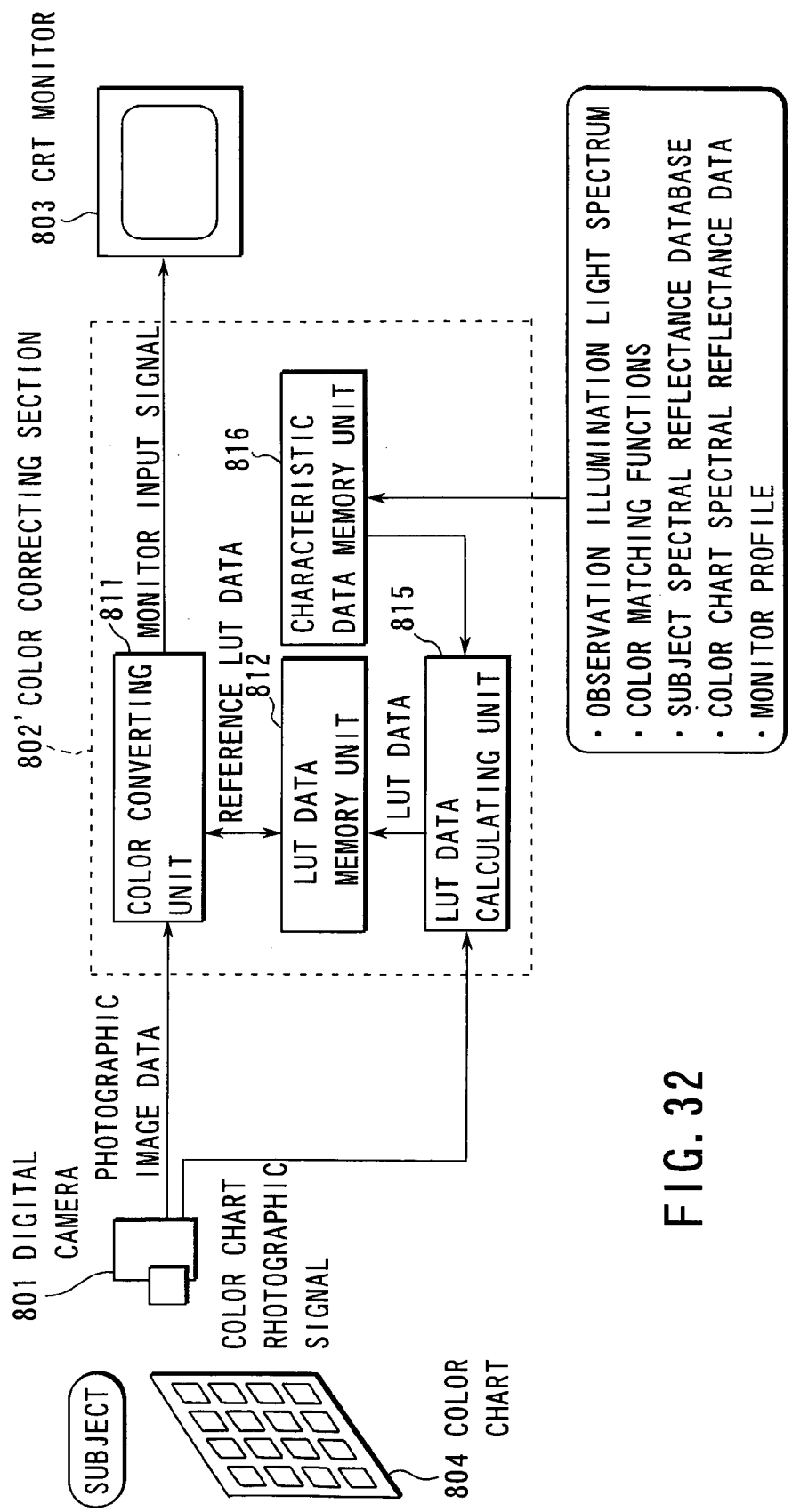
FIG. 32 is a block diagram showing a structure of a color reproduction system relating to an eleventh embodiment of the present invention.

FIG. 32 shows a structure of a color reproduction system relating to an eleventh embodiment of the present invention. This color reproduction system consists of a digital camera 801 as a color photographing section, a color correcting section 802', a CRT monitor 803, and a color chart 804. The color chart 804 consists of patches having 16 independent spectral reflectances (a plurality of objects having known spectral reflectances), each patch having a constant spectral reflectance.

The digital camera 801 has three bands of red (R), green (G) and blue (B). The digital camera 801 photographs a subject, and outputs photographic image data (a subject photographic image) of three channels for each pixel, to the color correcting section 802'. The photographic image data of each channel has a signal value of one byte (0 to 255). The color correcting section 802' converts the input photographic image data into a monitor input signal suitable for display in the CRT monitor 803, and outputs the converted signal to the CRT monitor 803. A subject image is displayed as a color image on the CRT monitor 803.

The color correcting section 802' consists of a color converting unit 811, an LUT data memory unit 812, an LUT data calculating unit 815, and a characteristic data memory unit 816. The color converting unit 811 and the LUT data memory unit 812 are similar to those explained in the tenth embodiment, and therefore, their explanation will be omitted here.

The LUT data calculating unit 815 calculates LUT data based on color chart photographic signals obtained by photographing the color chart 804 by the digital camera 801, an observation illumination light spectrum, color matching functions, a subject spectral reflectance database, color chart spectral reflectance data, and a monitor profile that have been input from the characteristic data memory unit 816. The LUT data calculating unit 815 outputs the calculated LUT data to the LUT data memory unit 812.

Figure 33:
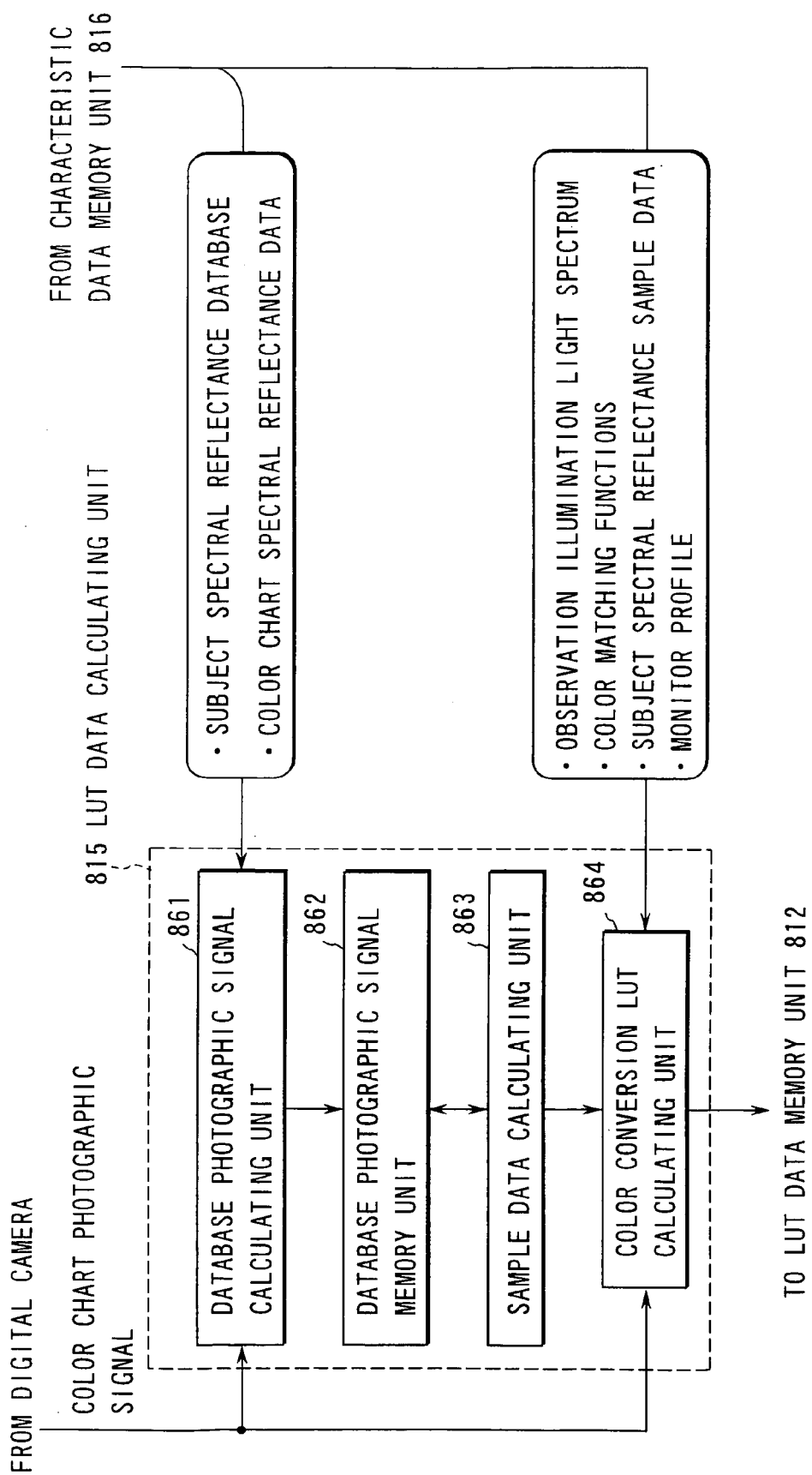
FIG. 33 is a block diagram showing a structure of an LUT data calculating unit in the eleventh embodiment.

FIG. 33 shows a structure of the LUT data calculating unit 815. The LUT data calculating unit 815 consists of a database photographic signal calculating unit 861, a database photographic signal memory unit 862, a sample data calculating unit 863, and color conversion LUT calculating unit 864.

The database photographic signal calculating unit 861 estimates photographic signals of each spectral reflectance of the subject spectral reflectance database, based on the color chart photographic signals input from the digital camera 801 shown in FIG. 32 and the color chart spectral reflectance data input from the characteristic data memory unit 816. Within the database photographic signal calculating unit 861, average signal value data (Rci, Gci, Bci) (i=1 to 16) of signals corresponding to 16 patches of the color chart 804 are first obtained from the color chart photographic signals input from the digital camera 801. A photographic signal (RiGiBi) of a spectral reflectance fi ($\lambda$) in the subject spectral reflectance database is obtained from the following expression.

$$\begin{pmatrix} R_i \\ G_i \\ B_i \end{pmatrix} = \begin{pmatrix} R_{c1} R_{c2} \ldots R_{c16} \\ G_{c1} G_{c2} \ldots G_{c16} \\ B_{c1} B_{c2} \ldots B_{c16} \end{pmatrix} \begin{pmatrix} c_{i1} \\ c_{i2} \\ \vdots \\ c_{i16} \end{pmatrix}$$

In the above expression, cij is an expansion coefficient obtained by expanding an i-th spectral reflectance fi ($\lambda$) of the subject spectral reflectance database based on a spectral reflectance pj ($\lambda$) (j=1 to 16) of each of the 16 patches of the color chart 804 as given by the following expression.

$$f_i(\lambda) = \sum_{j=1}^{16} c_{ij} p_j(\lambda)$$

The photographic signals calculated by the database photographic signal calculating unit 861 are stored in the database photographic signal memory unit 862. The database photographic signal memory unit 862 and the sample data calculating unit 863 are similar to those explained in the tenth embodiment, and therefore, their explanation will be omitted here.

Figure 34:
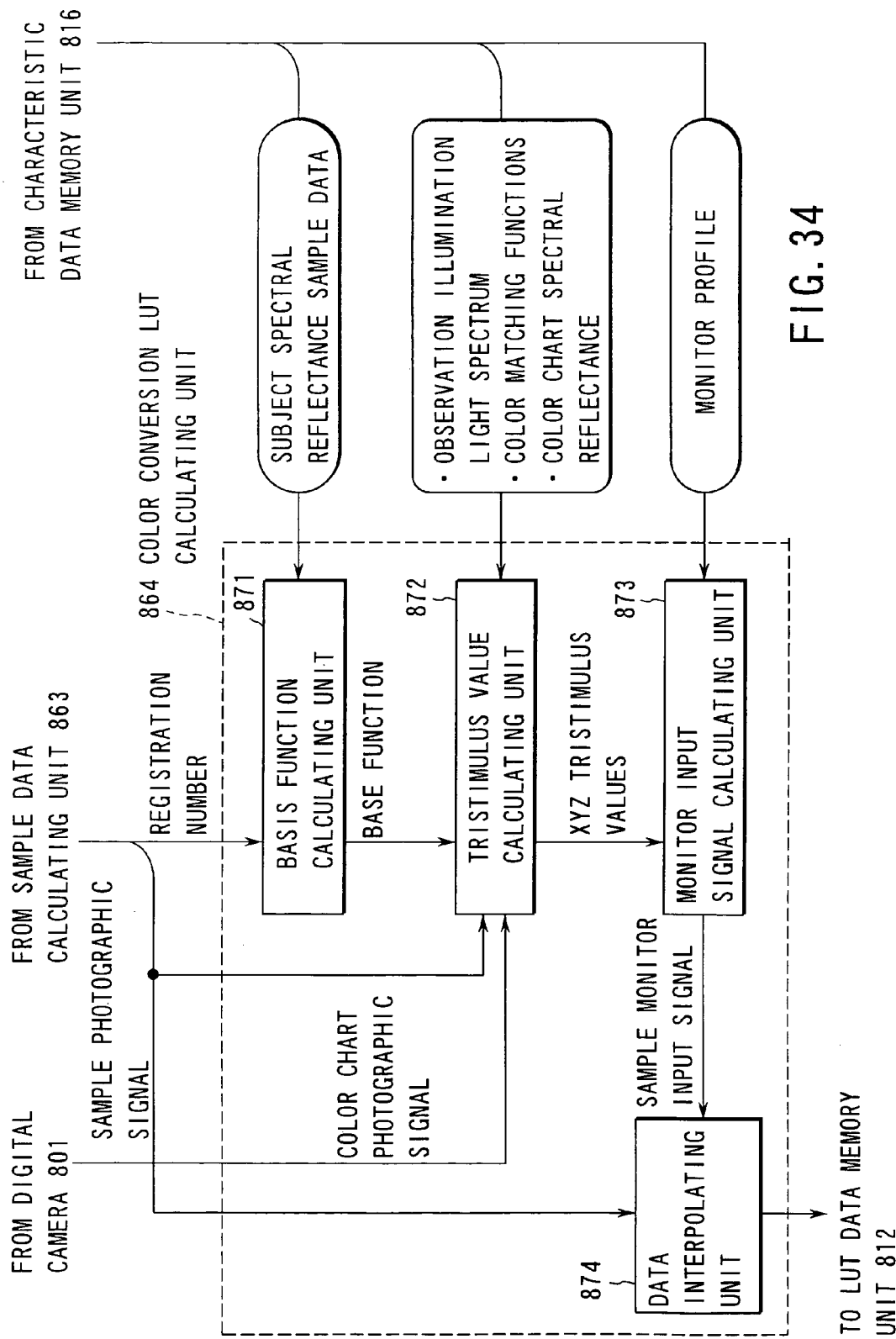
FIG. 34 is a block diagram showing a structure of a color conversion LUT calculating unit in FIG. 33.

FIG. 34 shows a structure of the color conversion LUT calculating unit 864. The color conversion LUT calculating unit 864 consists of a basis function calculating unit 871, a tristimulus value calculating unit 872, a monitor input signal calculating unit 873, and a data interpolating unit 874. Registration numbers i of ten photographic signal data selected by the sample data calculating unit 863 shown in FIG. 33 are input to the basis function calculating unit 871.

The basis function calculating unit 871 receives an input of the subject spectral reflectance data of the registration numbers i as subject spectral reflectance sample data, from the characteristic data memory unit 816 shown in FIG. 32. The basis function calculating unit 871 then obtains basis functions $\rho k$ ($\lambda$) (k=1 to 3) of the input data as statistical data of the spectral reflectances of the subject. The basis functions $\rho k$ ($\lambda$) (k=1 to 3) are obtained as eigen vectors of a correlation matrix of the spectral reflectances.

The tristimulus value calculating unit 872 calculates XYZ tristimulus values of the subject under the observation illumination light as follows, based on the data of a sample signal RsGsBs input from the sample data calculating unit 863 shown in FIG. 33, color chart photographic signals R (j), G (j) and B (j) (j=1 to 16) input from the digital camera 801 shown in FIG. 32, the basis functions $\rho k$ ($\lambda$) (k=1 to 3) input from the basis function calculating unit 871, an observation illumination light spectrum Eo ($\lambda$), color matching functions x ($\lambda$), y ($\lambda$) and z ($\lambda$), and color chart spectral reflectances pj ($\lambda$) (j=1 to 16) that have been input from the characteristic data memory unit 816 shown in FIG. 32. The tristimulus value calculating unit 872 then outputs the calculated XYZ tristimulus values of the subject to the monitor input signal calculating unit 873.

In other words, the tristimulus value calculating unit 872 calculates the spectral reflectances f ($\lambda$) of the subject, and obtains the tristimulus values XYZ under the observation illumination light based on this calculation, from the following expression.

$$X = \int_{\lambda=380}^{780} x(\lambda) E_o(\lambda) f(\lambda) d\lambda$$

$$Y = \int_{\lambda=380}^{780} y(\lambda) E_o(\lambda) f(\lambda) d\lambda$$

$$Z = \int_{\lambda=380}^{780} z(\lambda) E_o(\lambda) f(\lambda) d\lambda$$

The spectral reflectances f ($\lambda$) of the subject are obtained from the following expression.

$$F = B(QD)^{-1} G$$

where $$F = (f(380), f(381), \ldots, f(780))^t$$

$$B = \begin{pmatrix} \rho_1(380) \rho_2(380) \rho_3(380) \\ \rho_1(381) \rho_2(381) \rho_3(381) \\ \vdots \\ \rho_1(780) \rho_2(780) \rho_3(780) \end{pmatrix}$$

-continued $$Q = \begin{pmatrix} R^{(1)} R^{(2)} \ldots R^{(16)} \\ G^{(1)} G^{(2)} \ldots G^{(16)} \\ B^{(1)} B^{(2)} \ldots B^{(16)} \end{pmatrix}$$

$$D = \begin{pmatrix} d_1^{(1)} d_2^{(1)} d_3^{(1)} \\ d_1^{(2)} d_2^{(2)} d_3^{(2)} \\ \vdots \\ d_1^{(16)} d_2^{(16)} d_3^{(16)} \end{pmatrix}$$

$G=(R_s,G_s,B_s)^t$

In the above expression, elements dk (j) (k=1 to 3, j=1 to 16) of D are expansion functions obtained by expanding the basis functions based on the spectral reflectances of the patches of the color chart 804.

$$\rho_k(\lambda) = \sum_{j=1}^{16} d_k^{(j)} p_j(\lambda) \quad (k = 1 \text{ to } 3)$$

The tristimulus values XYZ calculated by the tristimulus value calculating unit 872 are output to the monitor input signal calculating unit 873. The monitor input signal calculating unit 873 and the data interpolating unit 874 are similar to those explained in the tenth embodiment, and therefore, their explanation will be omitted here.

According to the color reproduction system having the above-described structure of the present embodiment, the color correcting section 802' estimates tristimulus color values of subjects under the observation illumination light, based on the spectral sensitivity and the color matching functions of the digital camera 801, the spectrum of the observation illumination light, and the statistical data of the spectral reflectances of the subjects (the basis functions ρk (λ) (k=1 to 3) in the present example). Colors are estimated by changing over the basis functions ρk (λ) (k=1 to 3) as the statistical data according to photographic signals of the subjects. In other words, the basis functions ρk (λ) (k=1 to 3) are calculated based on the spectral reflectances of the subjects that give signal values close to the subject photographic signals. With this arrangement, it becomes possible to carry out color estimation in high precision.

Other Embodiments

The present invention is not limited to the tenth and eleventh embodiments. It is also possible to implement the invention through various modifications as follows.

(1) In the tenth and eleventh embodiments, the digital camera 801 of RGB three channels has been used as the color photographing section. However, the camera is not limited to this. It is also possible to use a digital camera of four or more channels.

(2) In the tenth and eleventh embodiments, the CRT monitor 803 has been used as the color image output section. However, it is also possible to use other display unit such as a projector, or to use a hardcopy output unit like a printer, instead of the CRT monitor.

(3) In the tenth embodiment, the statistical data of the spectral reflectances of the subjects are calculated based on the spectral sensitivity of the camera and the photographic illumination light spectrum at the time of the photographing. However, it is also possible to calculate in advance the correlation matrix data of spectral sensitivity of a predetermined camera and photographic illumination light spectrum, and to use this calculated data.

(4) In the eleventh embodiment, for photographing the subject and the color chart 804, it is possible to photograph the subject and the color chart separately when the photographing conditions are the same. Alternatively, it is also possible to photograph the subject and the color chart in one picture at the same time, and to separately take out the subject photographic signals and the color chart photographic signals after the photographing.

(5) In the eleventh embodiment, the number of patches included in the color chart 804 is optional. However, it is desirable that all the spectral reflectance data in the subject spectral reflectance database can be expanded in high precision based on the spectral reflectances of the patches included in the color chart 804.

As explained above, according to the color reproduction system of the tenth and eleventh embodiments, there is used statistical data of the spectral reflectances of subjects as foresight information based on the subject photographic signals obtained by photographing the subjects by the color photographing unit or the subject photographic signals and the object photographic signals obtained by photographing a plurality of objects of known spectral reflectances by using the color photographic unit. In estimating colors of the subjects under a predetermined illumination light, the statistical data is used by changing over the data according to the subject photographic signals. With this arrangement, it is possible to estimate colors of the subjects in high precision based on a simple system structure using a color photographing unit of a limited number of bands. As a result, it is possible to achieve an accurate color reproduction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color reproduction system comprising:
a color image input section; and
a color correcting section for correcting colors of an image of a subject obtained by photographing the subject by the color image input section, wherein
the color correcting section comprises:
an object recognizing section for dividing a subject image input from the color image input section into images of a plurality of areas, and selecting a suitable input profile from among a plurality of input profiles for each divided area;
a device-independent color converting section for converting an image of each area into a device-independent color image by using the input profile selected from among the plurality of input profiles;
an image combining section for combining the device-independent color images converted at divided areas into one device-independent color image; and
a device value image converting section for converting the combined device-independent color image into an output device value image by using a predetermined output profile.

2. A color reproduction system according to claim 1, wherein the input profile is prepared based on at least one of image input unit information that includes photographic characteristics of an image input unit used for the photographing and information on a set state of the color image input section, observation illumination light information, and subject characteristic information that represents statistical characteristics of spectral reflectances of the photographed subject.

* * * * *